US011872681B2

(12) United States Patent
Dedrickson

(10) Patent No.: US 11,872,681 B2
(45) Date of Patent: Jan. 16, 2024

(54) IMPACT TOOL

(71) Applicant: MILWAUKEE ELECTRIC TOOL CORPORATION, Brookfield, WI (US)

(72) Inventor: Ryan A. Dedrickson, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 233 days.

(21) Appl. No.: 17/047,858

(22) PCT Filed: Apr. 7, 2020

(86) PCT No.: PCT/US2020/027006
§ 371 (c)(1),
(2) Date: Oct. 15, 2020

(87) PCT Pub. No.: WO2020/210196
PCT Pub. Date: Oct. 15, 2020

(65) Prior Publication Data
US 2021/0162574 A1 Jun. 3, 2021

Related U.S. Application Data

(60) Provisional application No. 62/831,779, filed on Apr. 10, 2019.

(51) Int. Cl.
*B25D 9/12* (2006.01)
*B25D 16/00* (2006.01)
(Continued)

(52) U.S. Cl.
CPC ............. *B25D 9/125* (2013.01); *B25D 16/00* (2013.01); *B25D 17/06* (2013.01); *B25D 17/11* (2013.01);
(Continued)

(58) Field of Classification Search
CPC ........ B25D 9/125; B25D 16/00; B25D 17/06; B25D 17/11; B25D 2217/0015;
(Continued)

(56) References Cited

U.S. PATENT DOCUMENTS 3,321,043 A * 5/1967 Vaughn ................. B25B 21/026
277/390
5,092,410 A * 3/1992 Wallace .................. B25B 21/02
81/463
(Continued)

FOREIGN PATENT DOCUMENTS

CN 101837578 A 9/2010
JP H09109044 A 4/1997
(Continued)

OTHER PUBLICATIONS

International Search Report and Written Opinion for Application No. PCT/US2020/027006 dated Jul. 20, 2020 (15 pages).
(Continued)

*Primary Examiner* — Joshua G Kotis
*Assistant Examiner* — Scott A Howell
(74) *Attorney, Agent, or Firm* — Michael Best & Friedrich LLP

(57) ABSTRACT

An impact tool includes a housing having a handle portion defining a first axis, a motor supported by the housing and defining a motor axis, and a rotary impact mechanism arranged on a second axis that is perpendicular to the first axis. The rotary impact mechanism is configured to convert a continuous rotational input from the motor to consecutive rotational impacts upon a workpiece. The rotary impact mechanism includes a chamber containing a hydraulic fluid, an anvil positioned at least partially within the chamber, and a hammer for imparting the consecutive rotational impacts upon the anvil. The hydraulic fluid is configured to attenuate
(Continued)

a noise of the rotary impact mechanism that is created by the hammer impacting the anvil. The impact tool further includes a gear train that receives torque from the motor and includes a rotational input that transfers torque to the rotary impact mechanism.

24 Claims, 21 Drawing Sheets

(51) Int. Cl.
    *B25D 17/06*     (2006.01)
    *B25D 17/11*     (2006.01)
    *F16H 1/14*     (2006.01)
    *F16H 1/22*     (2006.01)
    *F16H 37/02*     (2006.01)
    *F16H 37/04*     (2006.01)

(52) U.S. Cl.
    CPC ............... *F16H 1/14* (2013.01); *F16H 1/222* (2013.01); *F16H 37/02* (2013.01); *F16H 37/041* (2013.01); *B25D 2217/0015* (2013.01); *B25D 2250/125* (2013.01); *F16H 2702/02* (2013.01)

(58) Field of Classification Search
    CPC ..... B25D 2250/125; F16H 1/14; F16H 1/222; F16H 37/02; F16H 37/041; F16H 2702/02; B25B 21/02–026
    See application file for complete search history.

(56) References Cited

U.S. PATENT DOCUMENTS

| | | | |
|---|---|---|---|
| 5,601,149 A | * | 2/1997 | Kawasaki .............. B25B 21/026 173/93.5 |
| 2001/0027871 A1 | * | 10/2001 | Tokunaga ............ B25B 23/1453 173/93.5 |
| 2004/0182588 A1 | * | 9/2004 | Tokunaga ............ B25B 23/1453 173/176 |
| 2013/0228354 A1 | | 9/2013 | Timmons |
| 2014/0216775 A1 | * | 8/2014 | Seith ......................... B25F 5/02 173/93 |
| 2015/0158165 A1 | | 6/2015 | McClung |
| 2016/0107303 A1 | * | 4/2016 | Roberts ................. B25D 16/006 173/104 |
| 2018/0001444 A1 | * | 1/2018 | Matsushita .............. B25B 23/18 |
| 2020/0023501 A1 | * | 1/2020 | Bandy ................. B25B 23/1475 |
| 2020/0262035 A1 | * | 8/2020 | Chang ................... B25B 23/145 |
| 2021/0162574 A1 | * | 6/2021 | Dedrickson ............ B25D 17/06 |
| 2022/0097215 A1 | * | 3/2022 | Dales .................. B25B 23/1453 |

FOREIGN PATENT DOCUMENTS

| | | |
|---|---|---|
| JP | 2012045669 A | 3/2012 |
| JP | 2017148881 A | 8/2017 |

OTHER PUBLICATIONS

Extended European Search Report for Application No. 20787551.9 dated Dec. 8, 2022 (6 pages).

* cited by examiner

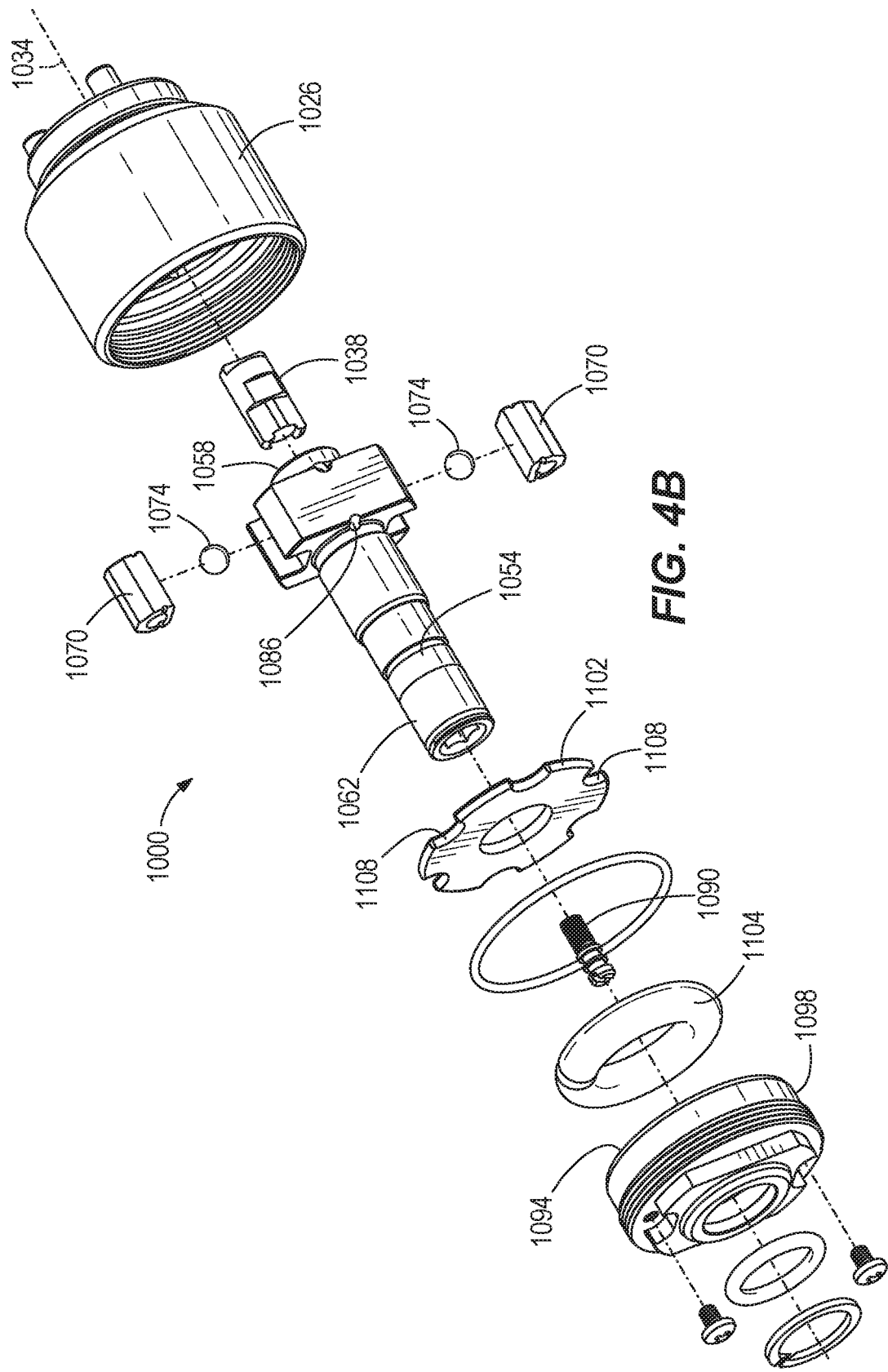

IMPACT TOOL

CROSS-REFERENCE TO RELATED APPLICATIONS

This application is a national phase filing under 35 U.S.C. 371 of International Application No. PCT/US2020/027006 filed on Apr. 7, 2020, which claims priority to U.S. Provisional Patent Application No. 62/831,779 filed on Apr. 10, 2019, the entire content of which is incorporated herein by reference.

FIELD OF THE INVENTION

The present invention relates to power tools, and more particularly to impact tools.

BACKGROUND OF THE INVENTION

Impact tools use an impact mechanism, such as a rotary impact mechanism, to impart repeated rotational impacts to a workpiece to perform work on the workpiece.

SUMMARY OF THE INVENTION

The present invention provides, in one aspect, an impact tool comprising a housing having a handle portion defining a first axis, a motor supported by the housing and defining a motor axis, and a rotary impact mechanism arranged on a second axis that is perpendicular to the first axis. The rotary impact mechanism is configured to convert a continuous rotational input from the motor to consecutive rotational impacts upon a workpiece. The rotary impact mechanism includes a chamber containing a hydraulic fluid, an anvil positioned at least partially within the chamber, and a hammer for imparting the consecutive rotational impacts upon the anvil. The hydraulic fluid is configured to attenuate a noise of the rotary impact mechanism that is created by the hammer impacting the anvil. The impact tool further comprises a gear train that receives torque from the motor and includes a rotational input that transfers torque to the rotary impact mechanism.

The present invention provides, in another aspect, an impact tool comprising a housing having a handle portion defining a first axis, a motor supported by the housing, and a rotary impact mechanism arranged on the first axis and configured to receive torque from the motor. The rotary impact mechanism is configured to convert a continuous rotational input from the motor to consecutive rotational impacts upon a workpiece. The rotary impact mechanism includes a chamber containing a hydraulic fluid, an anvil positioned at least partially within the chamber, and a hammer for imparting the consecutive rotational impacts upon the anvil. The hydraulic fluid is configured to attenuate a noise of the rotary impact mechanism that is created by the hammer impacting the anvil. The impact tool further comprises an output member for receiving torque from the rotary impact mechanism. The output member is arranged on a second axis that is perpendicular to the first axis.

Other features and aspects of the invention will become apparent by consideration of the following detailed description and accompanying drawings.

BRIEF DESCRIPTION OF THE DRAWINGS

FIG. 4B is an exploded perspective view of a first impact mechanism of FIG. 4A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
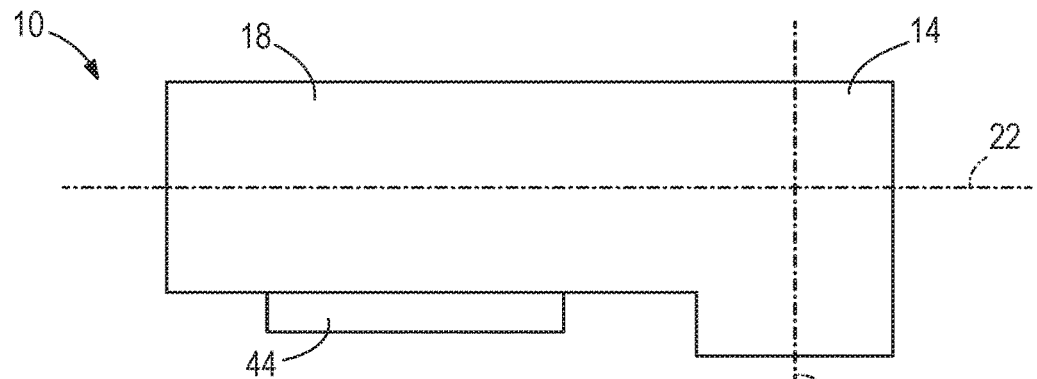
FIG. 1 is a schematic view of an impact tool in accordance with an embodiment of the invention.
Figure 2:
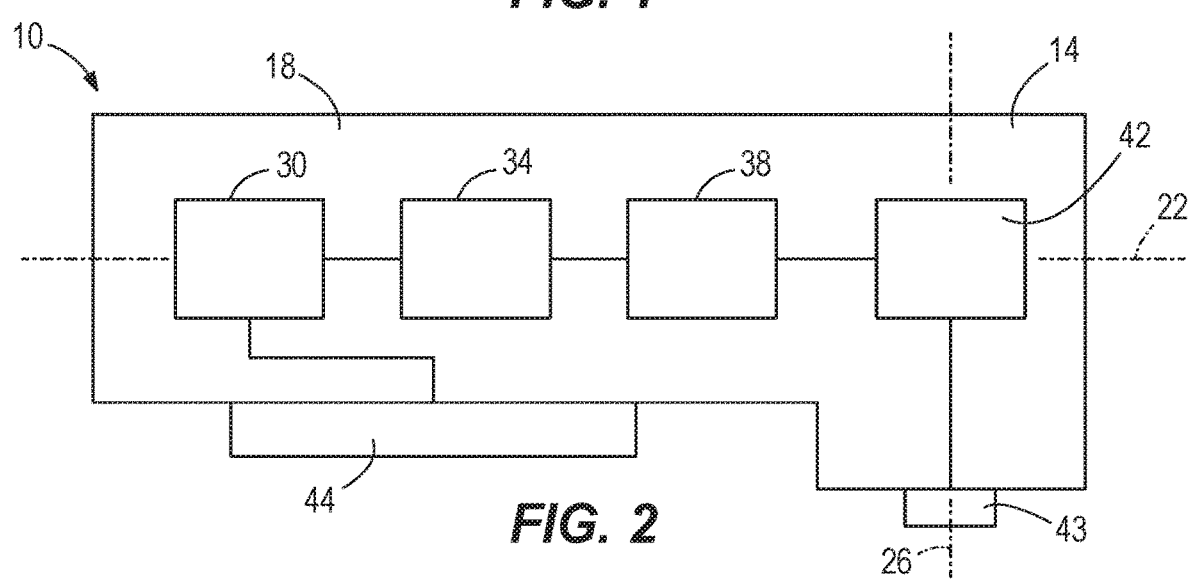
FIG. 2 is a schematic view of the impact tool of FIG. 1 in accordance with an embodiment of the invention.

FIG. 1 illustrates a right angle impact tool 10 having a housing 14 with a handle portion 18 defining a first, handle axis 22 that is perpendicular to a second, output axis 26 of the tool 10. FIG. 2 schematically illustrates a first embodiment of the impact tool 10. Specifically, in the embodiment of FIG. 2, the right angle impact tool 10 includes a motor 30, a gear train 34 receiving torque from the motor 14, a rotary impact mechanism 38 that receives torque from the gear train 34, and a rotational input 42 that receives torque from the impact mechanism 38 and drives an output member 43 defining the output axis 26. The output member 43 has a hexagonal receptacle therein for receipt of a tool bit. In some embodiments, instead of a hexagonal receptacle, the output member 43 includes a square drive, a hex drive, or a spline drive. In some embodiments, instead of a rotary impact mechanism 38, a mechanical impact mechanism may be used.

Figure 32:
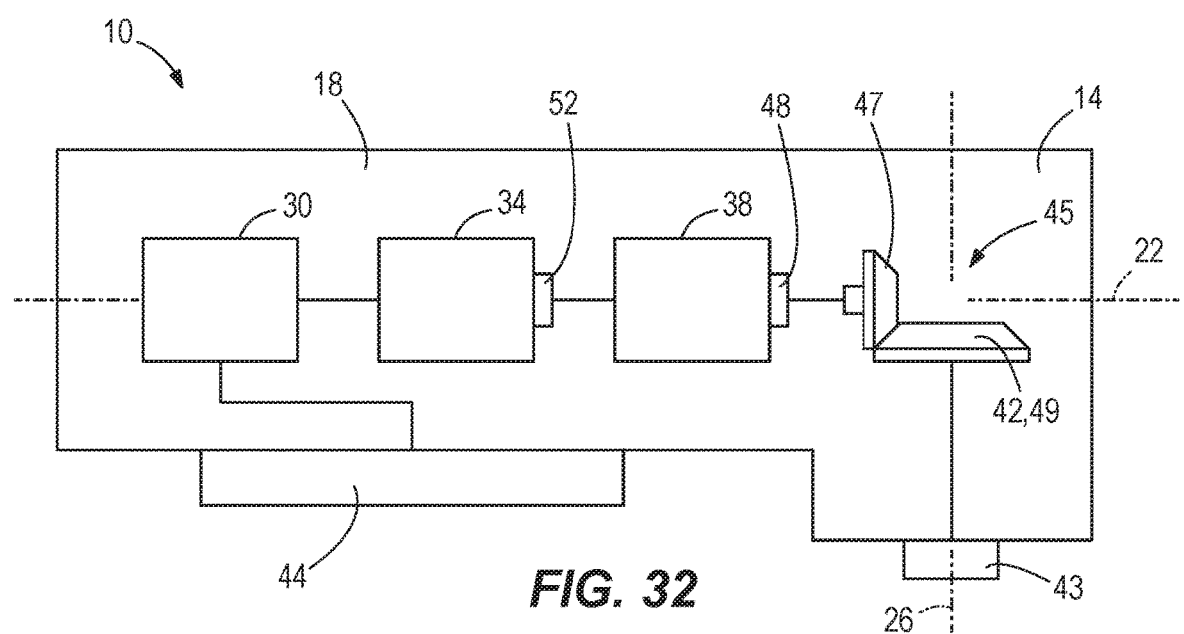
FIG. 32 is a schematic view of the impact tool of FIG. 1 in accordance with an embodiment of the invention.

As shown schematically in FIG. 32, in a specific implementation of the embodiment of FIG. 2, the rotary impact mechanism 38 is arranged on the first axis 22, the gear train 34 is a first gear train, and the right angle impact tool 10 includes a second gear train 45 configured to transfer torque from the rotary impact mechanism 38 to the output member 43. The second gear train 45 includes a pinion 47 that is coupled for co-rotation about the first axis 22 with an output 48 of the rotary impact mechanism 38. The second gear train 45 also includes a ring gear 49 that is engaged with the pinion 47, coupled to the output member 43, and rotatable about the output axis 26, such that the ring gear 49 functions as the rotational input 42 to transfer torque to the output member 43. As also shown in FIG. 2, the rotary impact mechanism 38 is coaxial with an output 52 of the first gear train 34 and is also coaxial with the pinion 47, which is the input of the second gear train 45.

Figure 3:
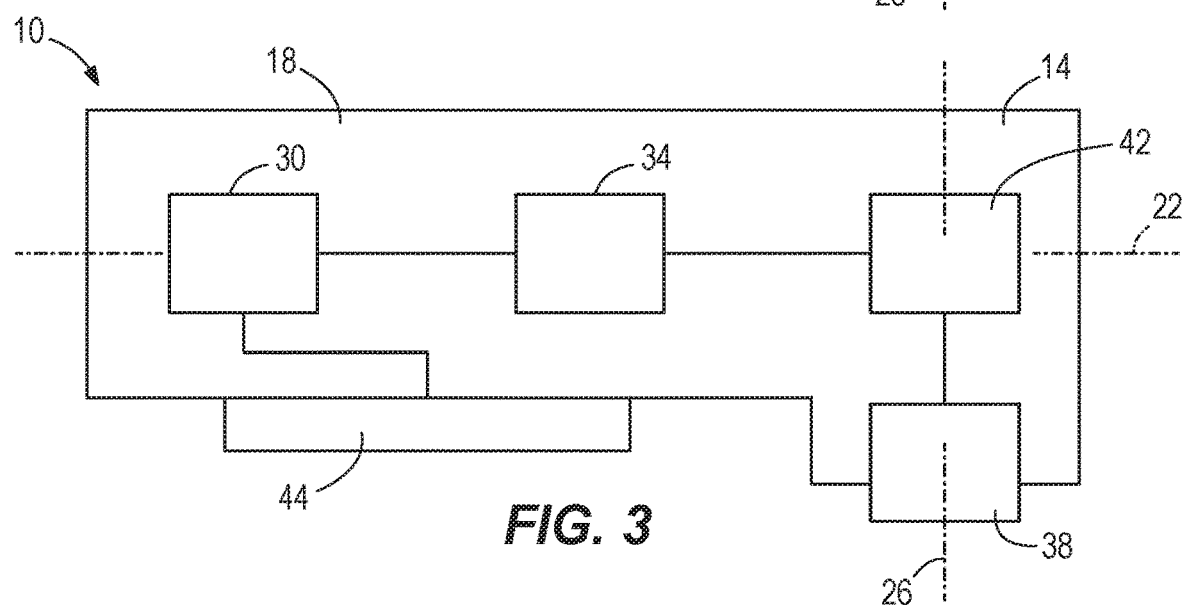
FIG. 3 is a schematic view of the impact tool of FIG. 1 in accordance with another embodiment of the invention.

FIG. 3 schematically illustrates a second embodiment of the impact tool 10. In the embodiment of FIG. 3, the right angle impact tool 10 includes the motor 30 and the gear train 34, but instead of receiving torque from the impact mechanism 38, the rotational input 42 is the final element of the gear train 34. Further, unlike the embodiment of FIG. 2, in the embodiment of FIG. 3, the impact mechanism 38 is downstream of the rotational input 42 and coaxial with the output axis 26, such that the rotational input 42 at the end of the gear train 34 provides rotational input to the impact mechanism 38. FIGS. 1-3 also illustrate a trigger 44 to actuate the motor 30.

Figure 4A:
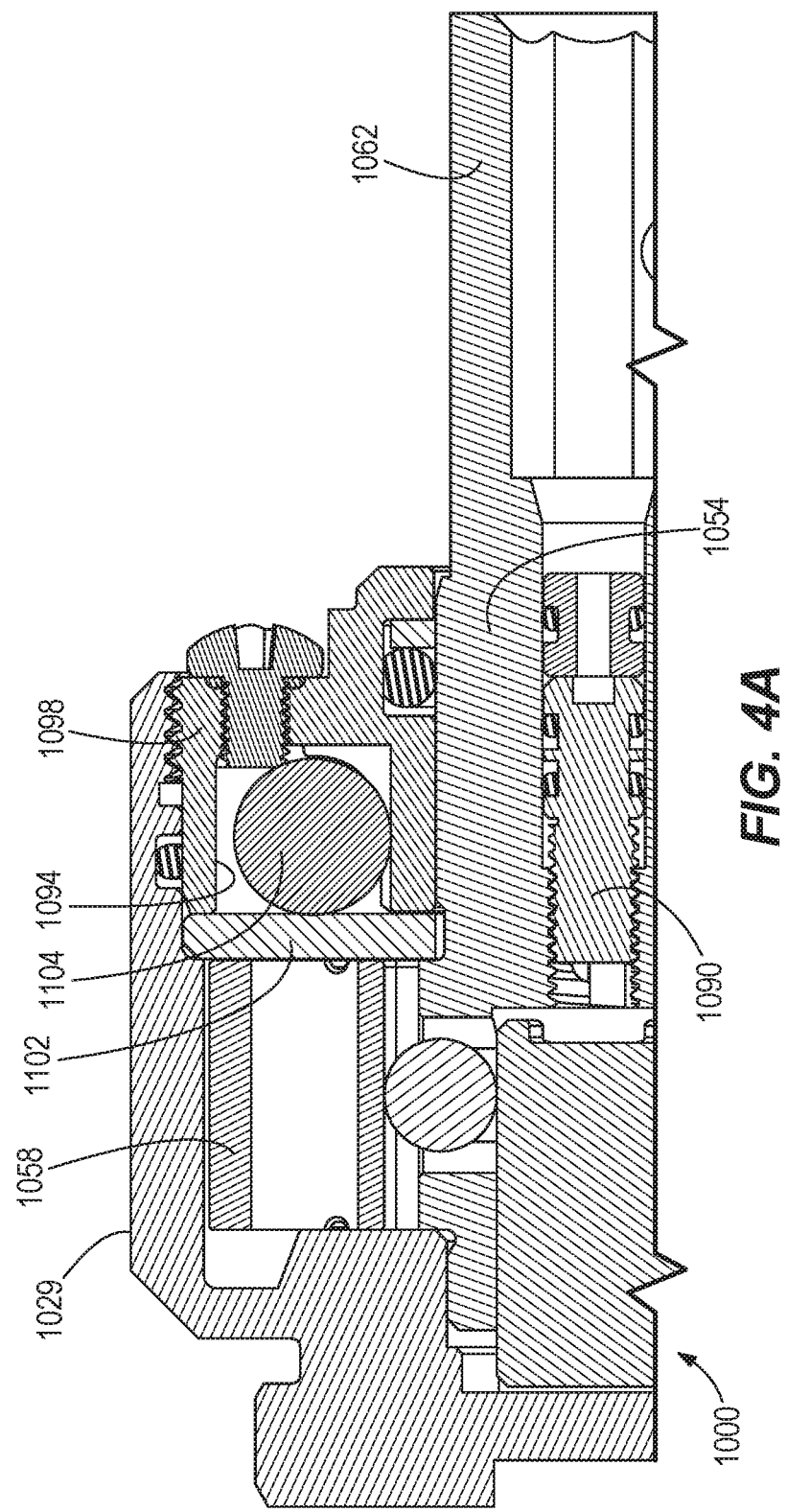
FIG. 4A is an assembled, cross-sectional view of a first impact mechanism of the impact tool of FIG. 1 in accordance with an embodiment of the invention.
Figure 5:
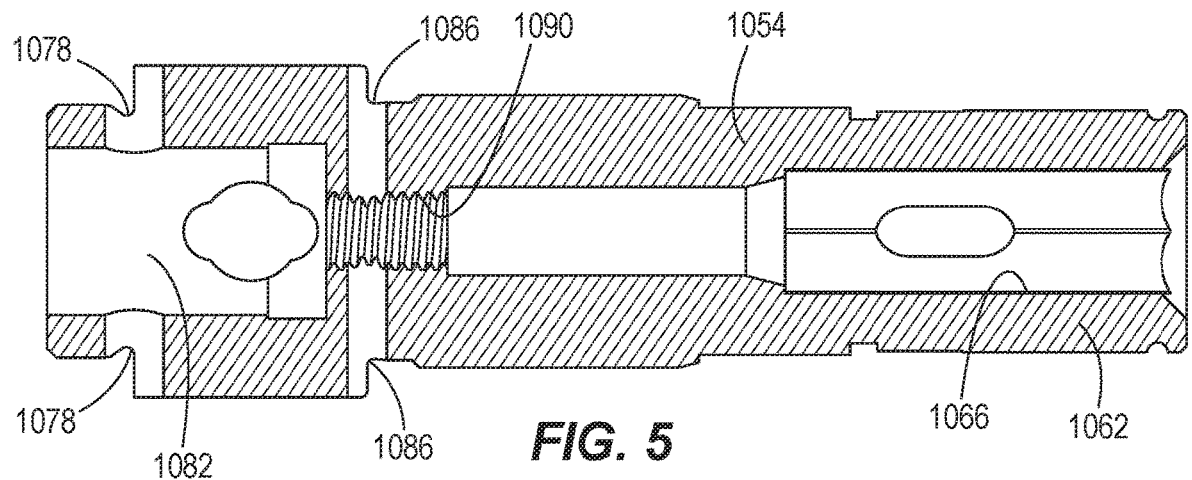
FIG. 5 is a cross-sectional view of an output shaft of the impact mechanism shown in FIG. 4A.
Figure 6:
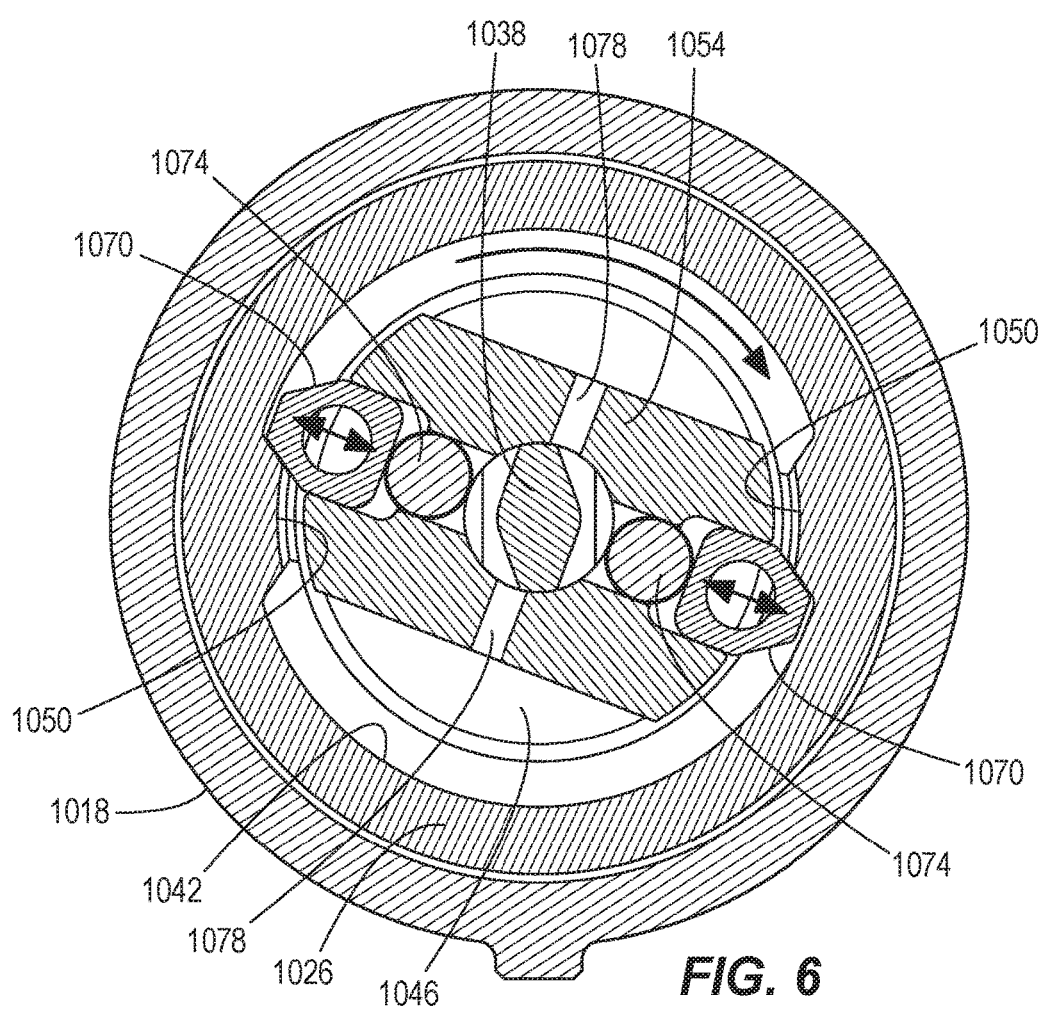
FIG. 6 is an assembled, cross-sectional view of a portion of the impact mechanism of FIG. 4A.

FIGS. 4-6 illustrate a first embodiment 1000 of the rotary impact mechanism 38 and FIGS. 7-12C illustrate a second embodiment 2000 of the rotary impact mechanism 38. Specifically, with reference to FIGS. 4A and 4B, the rotary impact mechanism 1000 includes a hammer or cylinder 1026 coupled for co-rotation with an output of the gear train 34 (FIG. 2) or rotational input 42 (FIG. 3). The rotary impact mechanism 1000 also includes a camshaft 1038, the purpose of which is explained in detail below, attached to the cylinder 1026 for co-rotation therewith about a longitudinal axis 1034. Although the camshaft 1038 is shown as a separate component from the cylinder 1026, the camshaft 1038 may alternatively be integrally formed as a single piece with the cylinder 1026.

With reference to FIG. 6, the cylinder 1026 includes a cylindrical interior surface 1042, which partly defines a cavity 1046, and a pair of radially inward-extending protrusions 1050 extending from the interior surface 1042 on opposite sides of the longitudinal axis 1034. In other words, the protrusions 1060 are spaced from each other by 180 degrees. The rotary impact mechanism 1000 further includes an anvil or output shaft 1054 (FIGS. 4-5), a rear portion 1058 of which is disposed within the cavity 1046 and a front portion 1062. In the embodiment of FIG. 3, the front portion 1062 extends from the housing 14 and includes a hexagonal receptacle 1066 (FIG. 5) therein for receipt of a tool bit.

The rotary impact mechanism 1000 also includes a pair of pulse blades 1070 (FIGS. 4 and 6) protruding from the output shaft 1054 to abut the interior surface 1042 of the cylinder 1026 and a pair of ball bearings 1074 are positioned between the camshaft 1038 and the respective pulse blades 1070. The output shaft 1054 has dual inlet orifices 1078 (FIG. 5), each of which extends between and selectively fluidly communicates the cavity 1046 and a separate high pressure cavity 1082 within the output shaft 1054. The output shaft 1054 also includes dual outlet orifices 1086 (FIG. 5) that are variably obstructed by an orifice screw 1090 (FIGS. 4A and 4B), thereby limiting the volumetric flow rate of hydraulic fluid that may be discharged from the output shaft cavity 1082, through the orifices 1086, and to the cylinder cavity 1046. The camshaft 1038 is disposed within the output shaft cavity 1082 and is configured to selectively seal the inlet orifices 1078.

With reference to FIGS. 4A and 4B, the cavity 1046 is in communication with a bladder cavity 1094, defined by an end cap 1098 attached for co-rotation with the cylinder 1026 (collectively referred to as a "cylinder assembly"), located adjacent the cavity 1046 and separated by a plate 1102 having apertures 1108 for communicating hydraulic fluid between the cavities 1046, 1094. A collapsible bladder 1104 having an interior volume 1142 filled with a gas, such as air at atmospheric temperature and pressure, is positioned within the bladder cavity 1094. The bladder 1104 is configured to be collapsible to compensate for thermal expansion of the hydraulic fluid during operation of the rotary impact mechanism 1000, which can negatively impact performance characteristics.

As shown in FIGS. 4A and 4B, prior to the end cap 1098 being threaded into the cylinder 1026, the collapsible bladder 1104 is bent into an annular shape and set into the bladder cavity 1094, which is also annular. Alternatively, the collapsible bladder 1104 can take any shape that permits the bladder to be set by fitment with the cavity 1094 and still effectively compensate for thermal expansion of the hydraulic fluid in the cavities 1046, 1094. After the end cap 1098 is threaded to the cylinder 1026, the collapsible bladder 1104 is trapped via fitment within the cavity 1094, having its annular shape maintained by the shape of the cavity 1094 itself.

In operation, upon activation of the motor 30 (e.g., by depressing a trigger 44), torque from the motor 30 is transferred to the cylinder 1026 via the gear train 34 (FIG. 2) or rotational input 42 (FIG. 3), causing the cylinder 1026 and camshaft 1038 to rotate in unison relative to the output shaft 1054 until the protrusions 1050 on the cylinder 1026 impact the respective pulse blades 1070 to deliver a first rotational impact to the output shaft 1054. Just prior to the first rotational impact, the inlet orifices 1078 are blocked by the camshaft 1038, thus sealing the hydraulic fluid in the output shaft cavity 1082 at a relatively high pressure, which biases the ball bearings 1074 and the pulse blades 1070 radially outward to maintain the pulse blades 1070 in contact with the interior surface 1042 of the cylinder. For a short period of time following the initial impact between the protrusions 1050 and the pulse blades 1070 (e.g., 1 ms), the cylinder 1026 and the output shaft 1054 rotate in unison.

Also at this time, hydraulic fluid is discharged through the outlet orifices 1086 at a relatively slow rate determined by the position of the orifice screw 1090, thereby damping the radial inward movement of the pulse blades 1070. Once the ball bearings 1074 have displaced inward by a distance corresponding to the size of the protrusions 1050, the pulse blades 1070 move over the protrusions 1050 and torque is no longer transferred to the output shaft 1054. The camshaft 1038 rotates independently of the output shaft 1054 again after this point, and moves into a position where it no longer seals the inlet orifices 1078 thereby causing fluid to be drawn into the output shaft cavity 1082 and allowing the ball bearings 1074 and pulse blades 1070 to displace radially outward once again. The cycle is then repeated as the cylinder 1026 continues to rotate, with torque transfer occurring twice during each 360 degree revolution of the cylinder. In this manner, the output shaft 1054 receives discrete pulses of torque from the cylinder 1026.

As noted above, FIGS. 7-12C illustrate a second embodiment 2000 of the rotary impact mechanism 38. Specifically, with reference to FIGS. 7-9, the rotary impact mechanism 2000 includes an anvil 2026, a hammer 2030, and a cylinder 2034. A driven end 2038 of the cylinder 2034 is coupled to the electric motor 2022 to receive torque therefrom, causing the cylinder 2034 to rotate. The cylinder 2034 at least partially defines a chamber 2042 (FIG. 9) that contains an incompressible fluid (e.g., hydraulic fluid, oil, etc.). The chamber 2042 is sealed and is also partially defined by an end cap 2046 secured to the cylinder 2034. The hydraulic fluid in the chamber 2042 reduces the wear and the noise of the rotary impact mechanism 2000 that is created by impacting the hammer 2030 and the anvil 2026.

Figure 7:
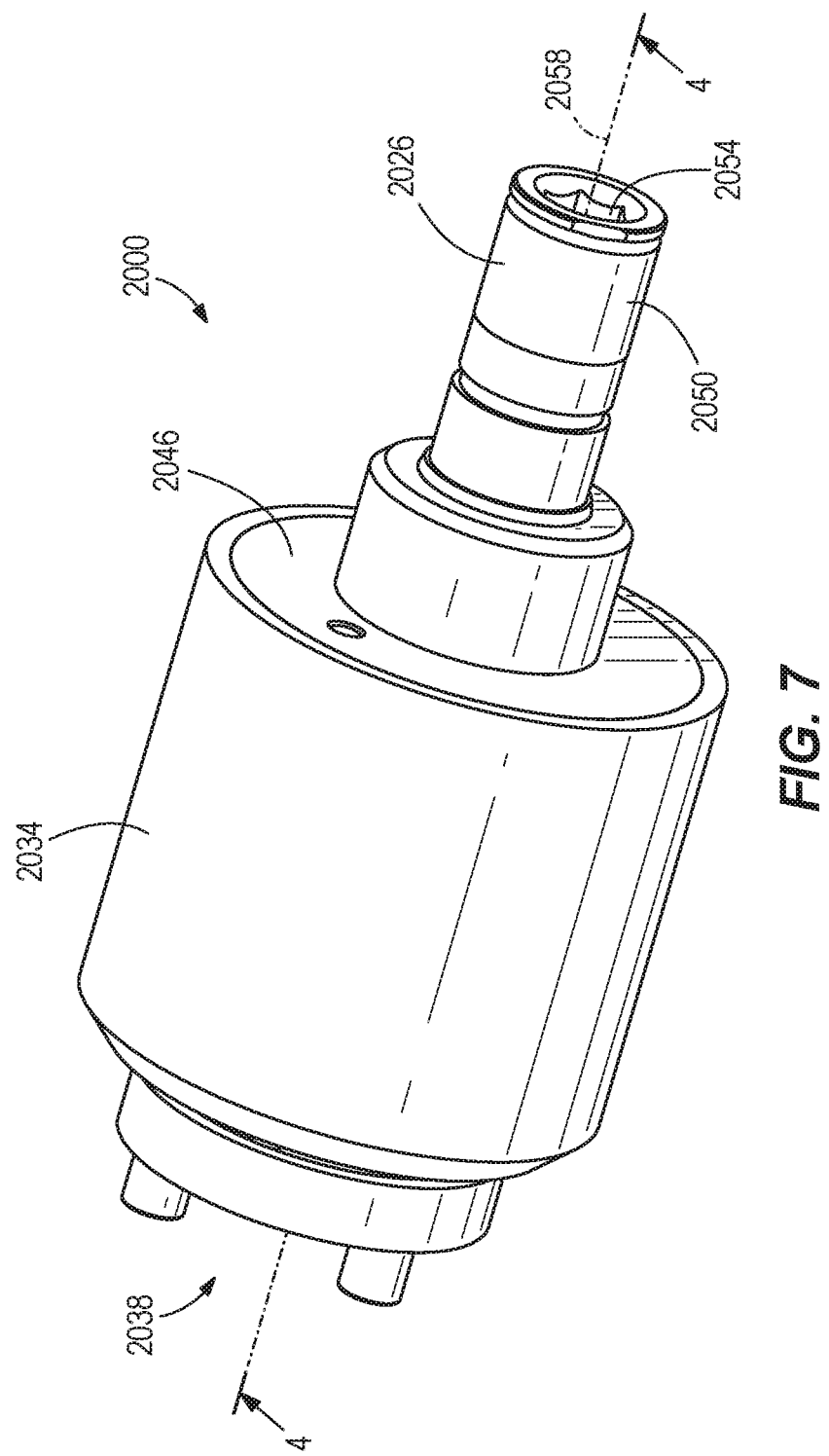
FIG. 7 is a perspective view of a second impact mechanism in accordance with another embodiment of the invention.
Figure 8:
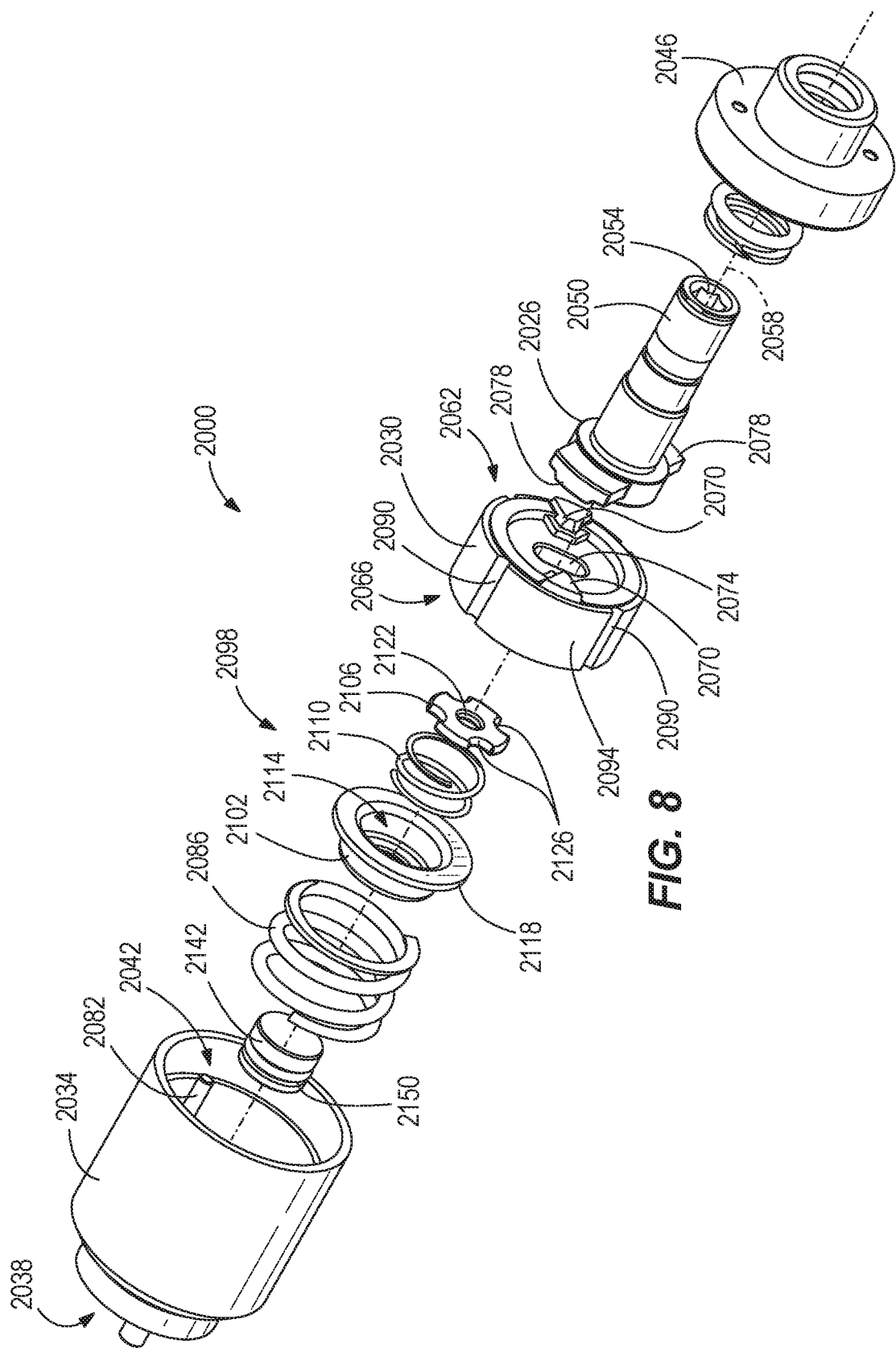
FIG. 8 is an exploded view of the impact mechanism of FIG. 7.
Figure 9:
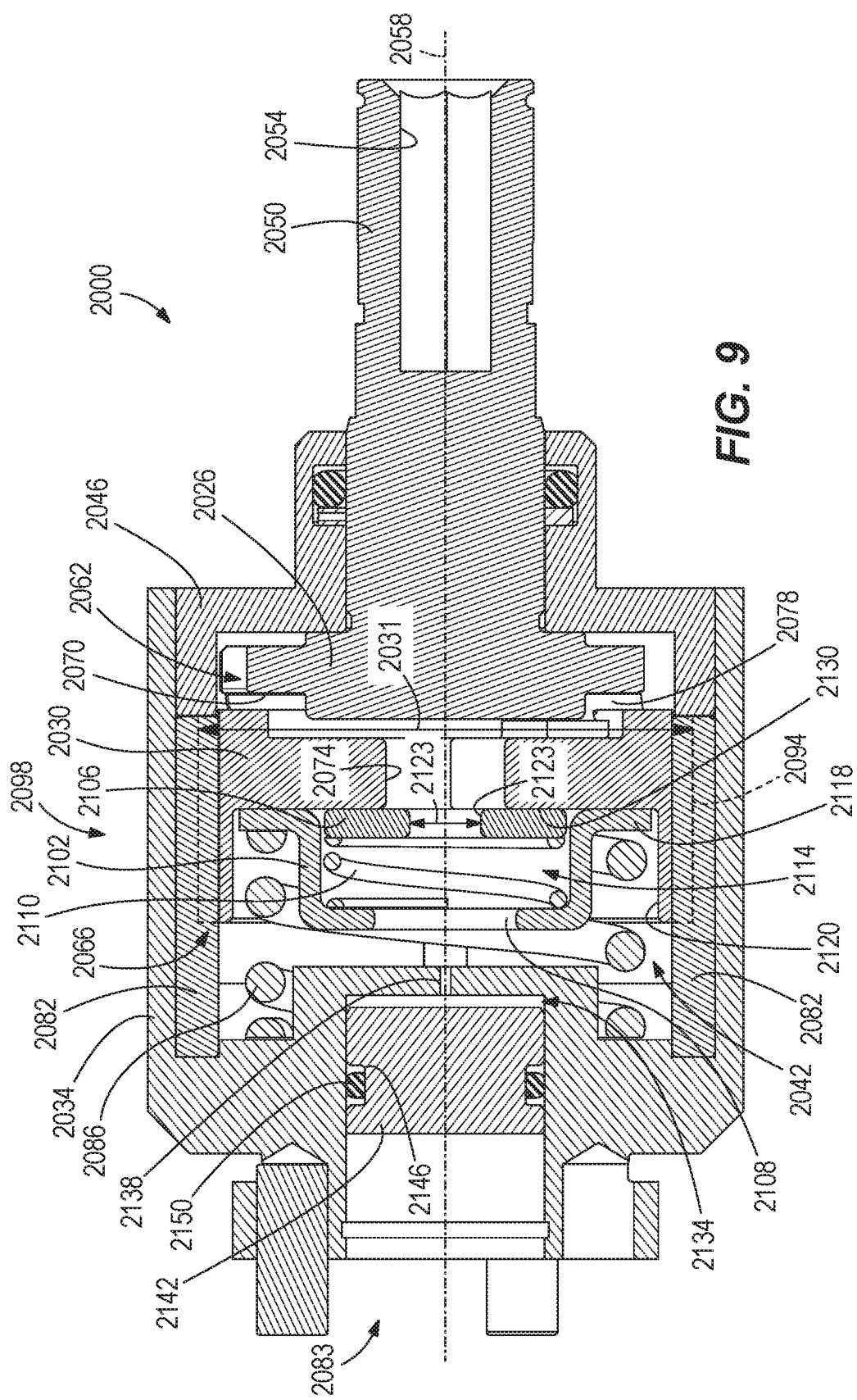
FIG. 9 is a cross-sectional view of the impact mechanism of FIG. 7, taken along section 4-4 in FIG. 7.

With continued reference to FIGS. 7-9, the anvil 2026 is positioned at least partially within the chamber 2042 and includes an output shaft 2050. In the embodiment of FIG. 3, the output shaft 2050 includes a hexagonal receptacle 2054 therein for receipt of a tool bit. In some embodiments, instead of a hexagonal receptacle, the output shaft 2050 includes a square drive, a hex drive, or a spline drive. The output shaft 2050 extends from the chamber 2042 and through the end cap 2046. The anvil 2026 rotates about a rotational axis 2058 defined by the output shaft 2050.

With continued reference to FIGS. 7-9, the hammer 2030 is positioned at least partially within the chamber 2042. The hammer 2030 includes a first side 2062 facing the anvil 2026 and a second side 2066 opposite the first side 2062. The hammer 2030 further includes hammer lugs 2070 and a central aperture 2074 extending between the sides 2062, 2066. As discussed in greater detail below, the central aperture 2074 permits the hydraulic fluid in the chamber 2042 to pass through the hammer 2030. The hammer lugs 2070 correspond to lugs 2078 formed on the anvil 2026. The rotational rotary impact mechanism 2000 further includes hammer alignment pins 2082 and a hammer spring 2086 (i.e., a first biasing member) positioned within the chamber 2042. The hammer alignment pins 2082 are coupled to the cylinder 2034 and are received within corresponding grooves 2090 formed on an outer circumferential surface 2094 of the hammer 2030 to rotationally unitize the hammer 2030 to the cylinder 2034 such that the hammer 2030 co-rotates with the cylinder 2034. The pins 2082 also permit the hammer 2030 to axially slide within the cylinder 2034 along the rotational axis 2058. In other words, the hammer alignment pins 2082 slide within the grooves 2090 such that the hammer 2030 is able to translate along the axis 2058 relative to the cylinder 2034. The hammer spring 2086 biases the hammer 2030 toward the anvil 2026.

The impact mechanism 2000 further defines a trip torque, which determines the reactionary torque threshold required on the anvil 2026 before an impact cycle begins. In one embodiment, the trip torque is equal to the sum of the torque due to seal drag, the torque due to the spring 2086, and the torque due to the difference in rotational speed of the hammer 2030 and the anvil 2026. In particular, the seal drag torque is the static friction between the O-ring and the anvil 2026. The spring torque contribution to the total trip torque is based on, among other things, the spring rate of the spring 2086, the height of the lugs 2070, and the coefficient of friction between the anvil lugs 2078 and the hammer lugs 2070. The torque from the difference in rotational speed of the anvil 2026 and the hammer 2030 is included in the torque calculation during impaction only, and has little to no effect on determining the trip torque threshold (i.e., is the damping force of the fluid rapidly moving through the orifice 2122). In some embodiments, the trip torque is within a range between approximately 10 in-lbf and approximately 30 in-lbf. In other embodiments, the trip torque is greater than 20 in-lbf. Increasing the trip torque increases the amount of time the hammer 2030 and the anvil 2026 are co-rotating (i.e., in a continuous drive).

With reference to FIGS. 8 and 9, the rotary impact mechanism 2000 further includes a valve assembly 2098 positioned within the chamber 2042 that allows for various fluid flow rates through the valve assembly 2098. As described in greater detail below, the valve assembly 2098 adjusts the flow of the hydraulic fluid in the chamber 2042 to decrease the amount of time it takes the hammer 2030 to return to the anvil 2026. In other words, the valve assembly 2098 reduces the time it takes to complete a single impact cycle. In particular, the flow rate through the valve assembly 2098 varies as the hammer 2030 translates within the cylinder 2034 along the axis 2058. The valve assembly 2098 includes a valve housing 2102 (e.g., a cupped washer), a valve (e.g., an annular disc 2106), and a spring 2110 (i.e., a second biasing member) positioned between the valve housing 2102 and the disc 2106. The valve housing 2102 includes a rear aperture 2108 and defines a cavity 2114 in which the disc 2106 and the spring 2110 are positioned. The spring 2110 biases the disc 2106 toward the hammer 2030, and the hammer spring 2086 biases the valve housing 2102 toward the hammer 2030. In particular, the valve housing 2102 includes a circumferential flange 2118 against which the spring 2086 is seated to bias the valve housing 2102 toward the hammer 2030. In other words, the valve housing 2102 is at least partially positioned between the spring 2086 and the hammer 2030. With reference to FIG. 9, the hammer 2030 defines a recess 2120 and the valve assembly 2102 is at least partially received with the recess 2120.

With reference to FIG. 8, the disc 2106 includes a central aperture 2122 and at least one auxiliary opening 2126. The aperture 2122 of the disc 2106 is in fluid communication with the aperture 2074 formed in the hammer 2030 (FIG. 9). In the illustrated embodiment, the auxiliary openings 2126 are positioned circumferentially around the aperture 2122 and are formed as grooves in the outer periphery of the disc 2106. In other embodiments, the auxiliary openings may be apertures formed in any location on the disc 2106. In further alternative embodiments, the auxiliary opening may be formed as part of the central aperture 2122 to form one single aperture with less than the entire aperture in fluid communication with the aperture 2074 during at least a portion of operation. In other words, the auxiliary openings may be formed as cutouts or scallops contiguous with the central aperture 2122 that are sometimes blocked and sometimes opened by the hammer 2066 during operation of the impact mechanism 2000.

With continued reference to FIG. 9, the central aperture 2122 defines an orifice diameter 2123 and the hammer 2030 defines a hammer diameter 2031. A ratio R of the hammer diameter 2031 to the orifice diameter 2123 is large and beneficially allows less reliance on tolerances and removes a feature that requires calibration. Additionally, the large ratio R makes leak paths less significant relative to fluid moved by the hammer 2030. Furthermore, the impact tool 2010 has a greater total amount of fluid contained within the rotary impact mechanism 2000. As such, a greater volume of fluid is moved with each stroke of the hammer 2030. In one embodiment, the total fluid in the rotary impact mechanism 2000 is greater than approximately 18,000 cubic mm (18 mL). In another embodiment, the total fluid in the rotary impact mechanism 2000 is greater than approximately 20,000 cubic mm (20 mL). In another embodiment, the total fluid in the rotary impact mechanism 2000 is greater than approximately 22,000 cubic mm (22 mL). Likewise, the amount of fluid moved with each stroke of the hammer 2030 in one embodiment is greater than approximately 1000 cubic mm (1 mL). In another embodiment, the fluid moved with each stroke of the hammer 2030 is greater than approximately 1250 cubic mm (1.25 mL). In another embodiment, the fluid moved with each stroke of the hammer 2030 is approximately 1500 cubic mm (1.5 mL). A greater amount of fluid moved with each stroke of the hammer 2030 results in fluid leak paths having a proportionally smaller effect on the performance of the tool 2010. Additionally, by moving a greater area of fluid, the rotary impact mechanism 2000 experiences less pressure for the same amount of torque.

The disc 2106 is moveable between a first position (FIG. 9) that permits a first hydraulic fluid flow rate in the chamber 2042 from the second side 2066 to the first side 2062 of the hammer 2030, and a second position (FIG. 12B) that permits a second hydraulic fluid flow rate in the chamber 2042 from the first side 2062 to the second side 2066 of the hammer 2030. In the illustrated embodiment, the second fluid flow rate is greater than the first fluid flow rate, and the disc 2106 is in the second position (FIG. 12B) when the hammer 2030 moves along the axis 2058 toward the anvil 2026. In particular, the hammer 2030 defines a rear surface 2130 on the second side 2066 and the disc 2106 engages the rear surface 2130 when the disc 2106 is in the first position (FIG. 9). In contrast, the disc 2106 is spaced from the rear surface 2130 when the disc 2106 is in the second position (FIG. 12B).

With reference to FIGS. 8 and 9, when the disc 2106 is in the first position, the hydraulic fluid flows through the central aperture 2122 but does not flow through the auxiliary openings 2126. In other words, when the valve assembly 2098 is in a closed state (FIG. 9), the spring 2110 biases the disc 2106 against the hammer 2030, blocking the auxiliary openings 2126 with the rear surface 2130 while the central opening 2122 remains in fluid communication with the aperture 2074 formed in the hammer 2030 (FIG. 9). When the disc 2106 is in the second position, the hydraulic fluid flows through the central aperture 2122 and the auxiliary openings 2126. In other words, when the valve assembly 2098 is in an open state (FIG. 12B), the disc 2106 separates from the hammer 2030, which unblocks the auxiliary openings 2126 and places the auxiliary openings 2126 in fluid communication with the central aperture 2074 of the hammer 2030. As a result, the valve assembly 2098 provides an increased hydraulic fluid flow rate in one direction, which allows faster fluid pressure equalization when the hammer 2030 is translating along the axis 2058 toward the anvil 2026.

With continued reference to FIGS. 8 and 9, the impact tool 2010 further includes an expansion chamber 2134 defined in the cylinder 2034. The expansion chamber 2134 contains the hydraulic fluid and is in fluid communication with the chamber 2042 by a passageway 2138 (e.g., a pin hole) formed within the cylinder 2034. A plug 2142 is positioned within the expansion chamber 2134 and is configured to translate within the expansion chamber 2134 to vary a volume of the expansion chamber 2134. In other words, the plug 2142 moves with respect to the cylinder 2134 to vary the volume of the expansion chamber 2134. The size of the passageway 2138 is minimized to restrict flow between the expansion chamber 2134 and the chamber 2142 and to negate the risk of large pressure developments over a short period of time, which may otherwise cause significant fluid flow into the expansion chamber 2134. In some embodiments, the diameter of the passageway 2138 is within a range between approximately 0.4 mm and approximately 0.6 mm. In further embodiments, the diameter of the passageway 2138 is approximately 0.5 mm. In the illustrated embodiment, the plug 2142 includes an annular groove 2146 and an O-ring 2150 positioned within the annular groove 2146. The O-ring 2150 seals the sliding interface between the plug 2142 and the expansion chamber 2134. As such, the plug 2142 moves axially within the expansion chamber 2134 to accommodate changes in temperature and/or pressure resulting in the expansion or contraction of the fluid within the sealed rotational rotary impact mechanism 2000. As such, a bladder or the like compressible member is not required in the cylinder 2034 to accommodate pressure changes.

Over extended periods of use, the output torque of the rotary impact mechanism 2000 may degrade because the fluid within the sealed rotational rotary impact mechanism 2000 generates heat and as the temperature increases, the fluid viscosity changes. A fluid with a higher viscosity index (VI) is utilized to reduce the change in viscosity due to changes in temperature, thereby providing more consistent performance. In one embodiment, the fluid viscosity index is greater than approximately 2035. In another embodiment, the fluid viscosity index is greater than approximately 2080. In another embodiment, the fluid viscosity index is within a range between approximately 2080 and approximately 2110. In the embodiment of the impact mechanism 2000, the impact tool 10 includes a temperature sensor that senses the temperature of the fluid within the rotary impact mechanism 2000 and communicates the fluid temperature to a controller. The controller is configured to then electrically compensate for changing fluid temperature in order to output consistent torque at different temperatures.

Figure 10:
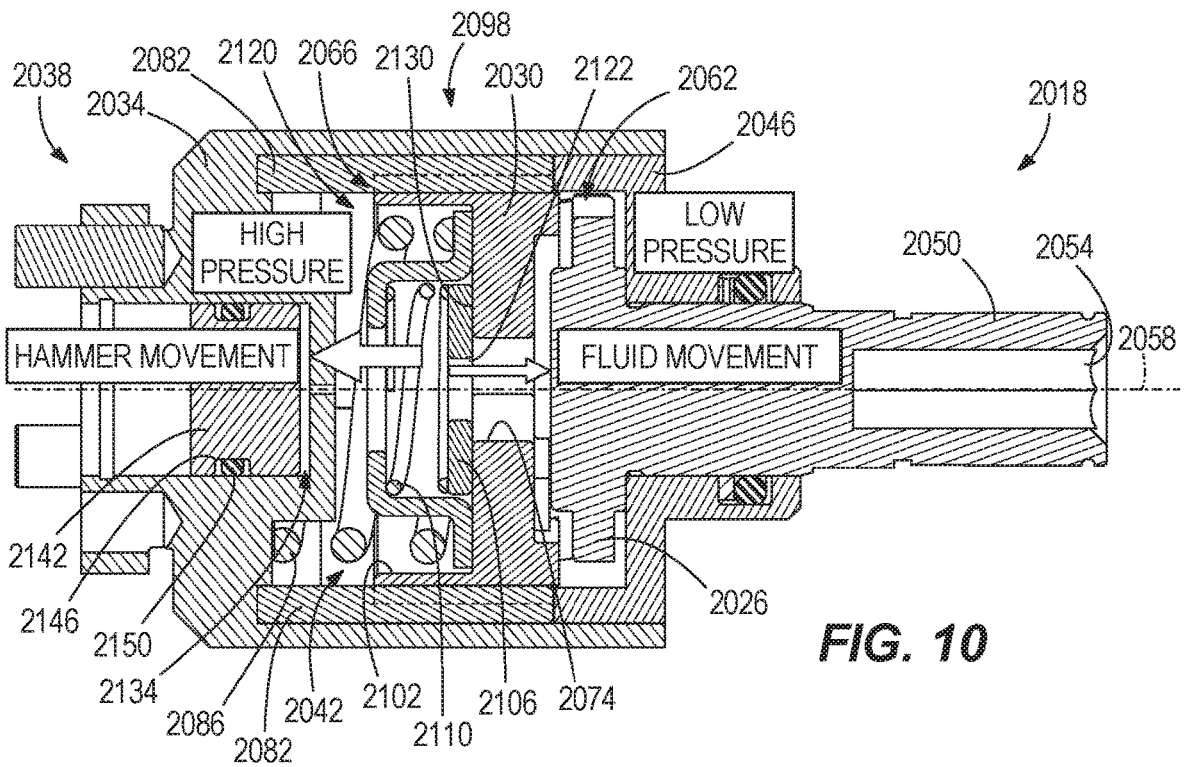
FIG. 10 is a cross-sectional view of the impact mechanism of FIG. 7, illustrating an overview of a retraction phase.
Figure 11A:
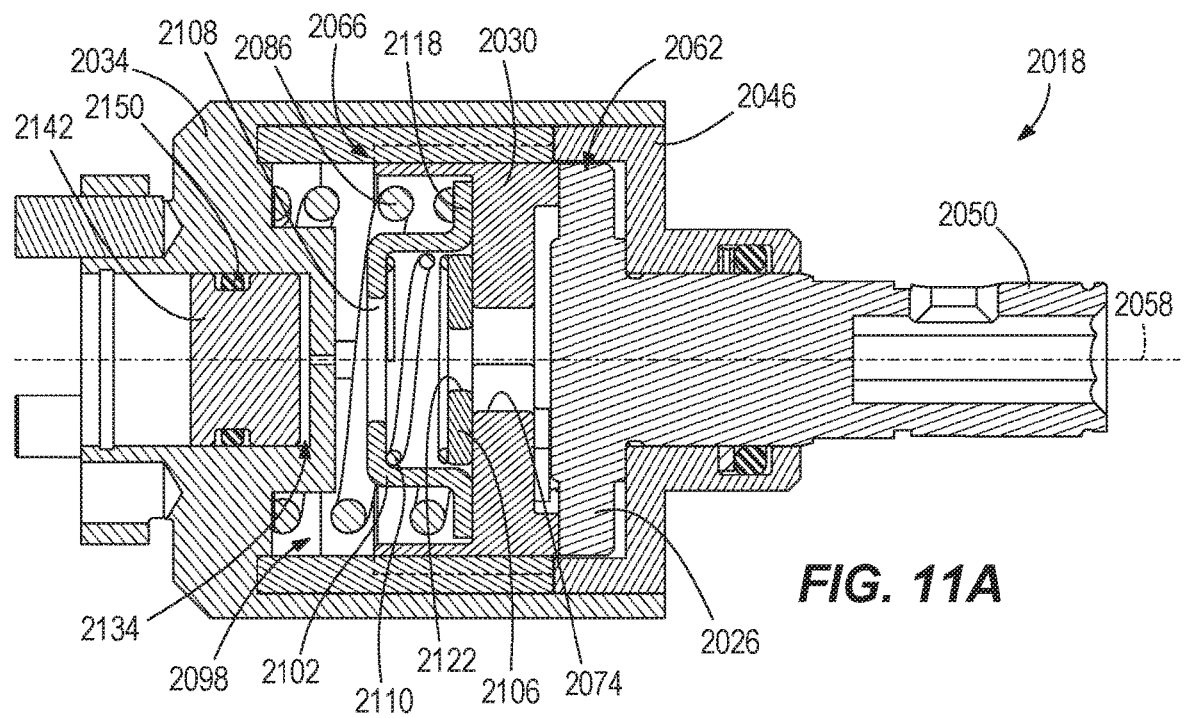
FIGS. 11A-11C are cross-sectional views of the impact mechanism of FIG. 7, illustrating operation of the retraction phase.
Figure 11B:
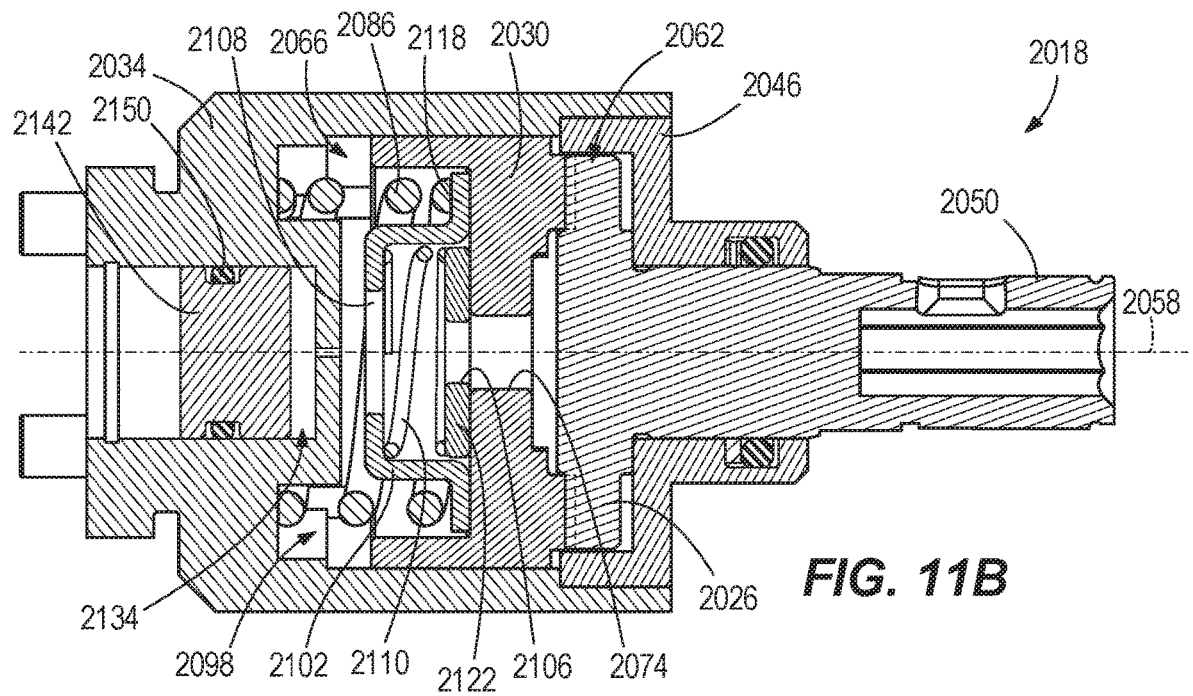
Figure 11C:
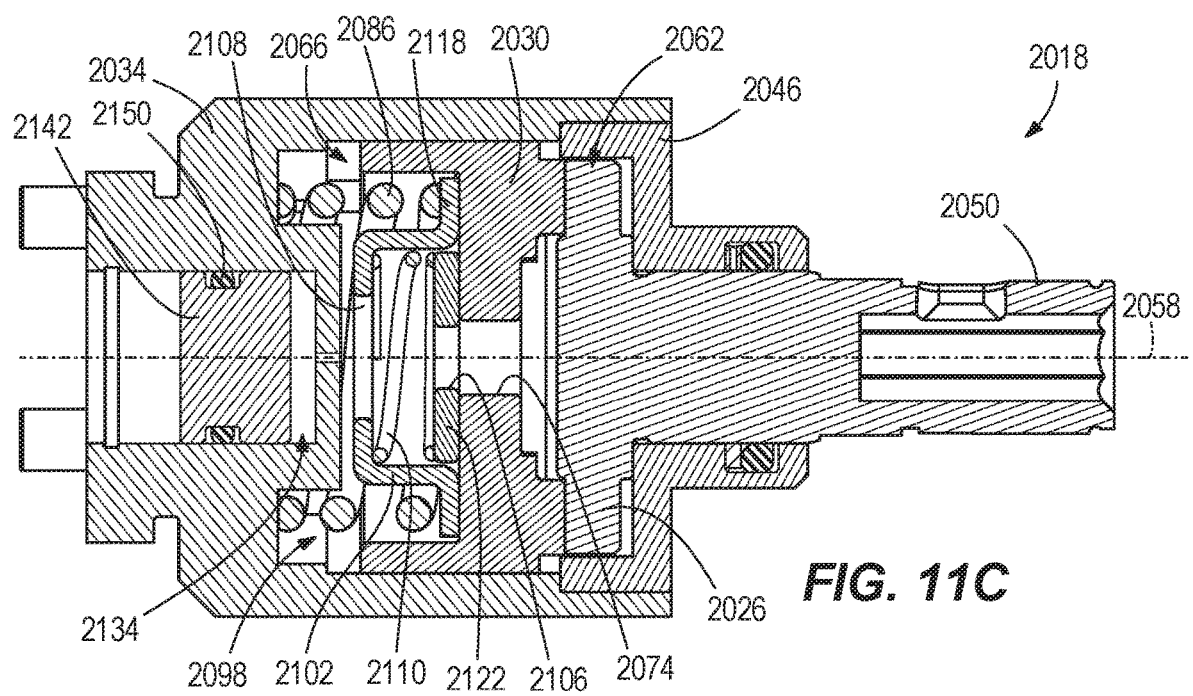

During operation of the impact mechanism 2000, the hammer 2030 and the cylinder 2034 rotate together and the hammer lugs 2070 rotationally impact the corresponding anvil lugs 2078 to impart consecutive rotational impacts to the anvil 2026 and the output shaft 2050. When the anvil 2026 stalls, the hammer lugs 2070 ramp over and past the anvil lugs 2078, causing the hammer 2030 to translate away from the anvil 2026 against the bias of the hammer spring 2086. FIG. 10 illustrates an overview of a hammer retraction phase, and FIGS. 11A-11C illustrate step-wise operation of the retraction phase. FIG. 11A illustrates the rotary impact mechanism 2000 when the hammer lugs 2070 first contact the anvil lugs 2078. FIG. 11B illustrates the rotary impact mechanism 2000 when the hammer 2030 begins to translate away from the anvil 2026. As the hammer 2030 moves away from the anvil 2026, the hydraulic fluid in the chamber 2042 on the first side 2062 of the hammer 2030 is at a low pressure while the hydraulic fluid in the chamber 2042 on the second side 2066 of the hammer 2030 is at a high pressure (FIG. 10). In addition, the valve assembly 2098 translates with the hammer 2030, away from the anvil 2026. The hydraulic fluid flows from the second side 2066 to the first side 2062 by traveling through the central aperture 2122 of the disc 2106 and the hammer aperture 2074. At the end of the retraction phase (FIG. 11C), the hammer spring 2086 is compressed and the hammer lugs 2070 have almost rotationally cleared the anvil lugs 2078.

Figure 12A:
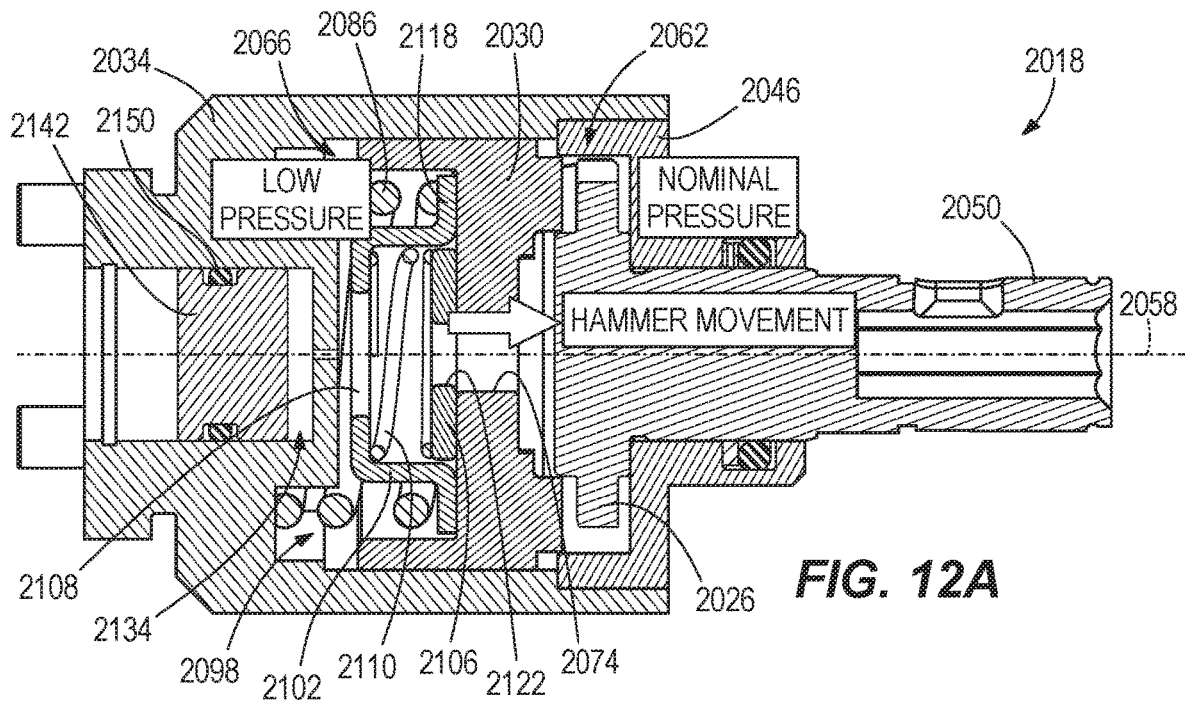
FIGS. 12A-12C are cross-sectional views of the impact mechanism of FIG. 7, illustrating operation of a return phase.
Figure 12B:
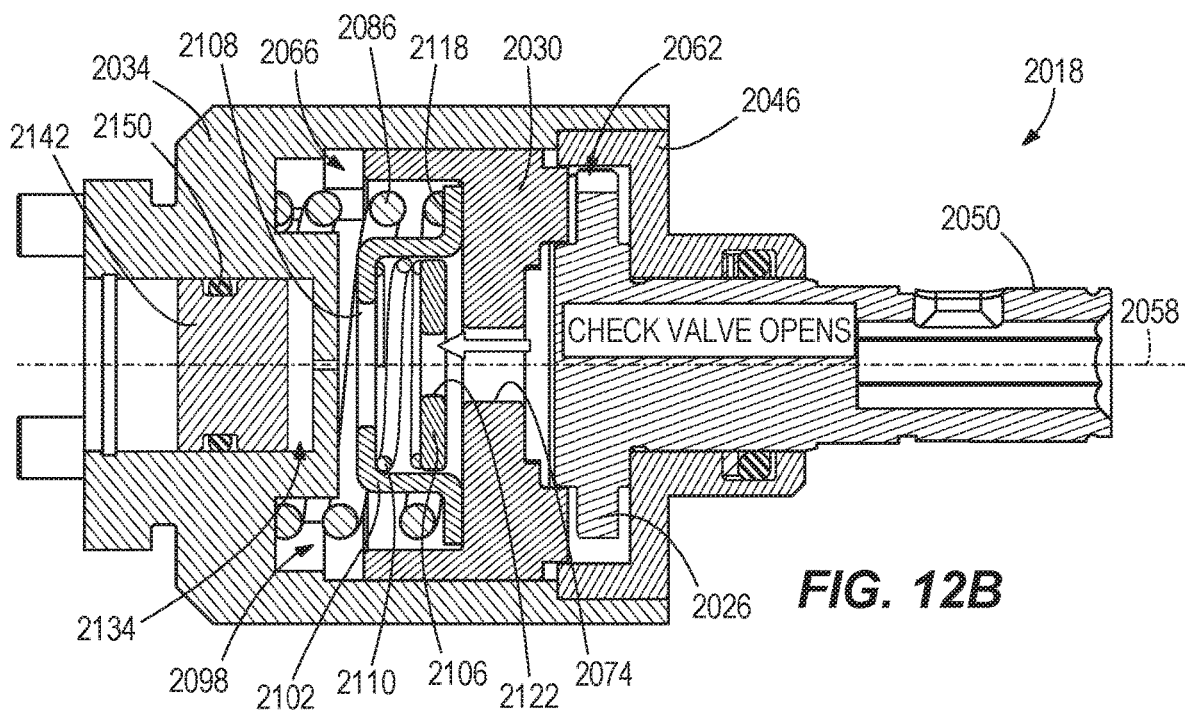
Figure 12C:
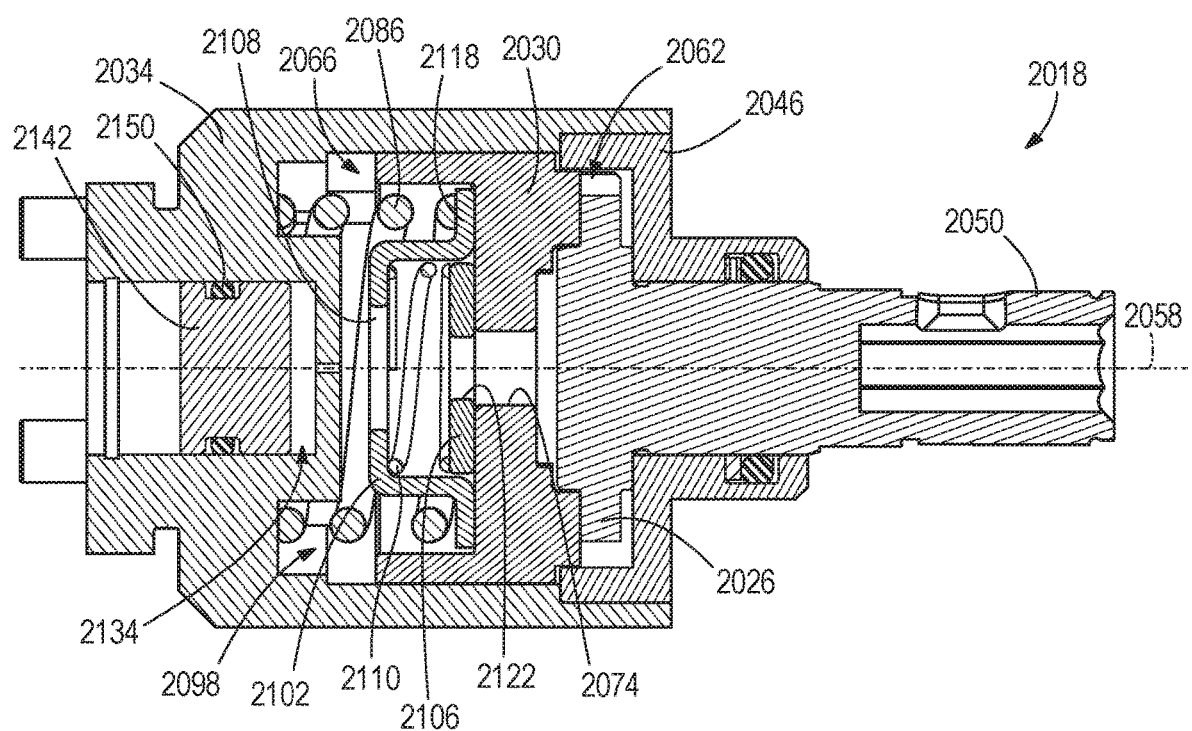

Once the hammer lugs 2070 rotationally clear the anvil lugs 2078, the spring 2086 biases the hammer 2030 back towards the anvil 2026 in a hammer return phase (FIG. 12A-12C). FIG. 12A illustrates the rotary impact mechanism 2000 when the hammer 2030 begins to translate toward the anvil 2026. As the hammer 2030 moves toward the anvil 2026, the hydraulic fluid in the chamber 2042 on the first side of the hammer 2030 is at a nominal pressure while the hydraulic fluid in the chamber 2042 on the second side 2066 of the hammer 2030 is at a low pressure (FIG. 12A). FIG. 12B illustrates the rotary impact mechanism 2000 with the valve assembly 2098 in the open state as the hammer 2030 translates toward the anvil 2026. The hammer spring 2086 keeps the flange 2118 of the valve housing 2102 in contact with the rear surface 2130 of the hammer 2030 as the disc 2106 separates from the rear surface 2130 due to the pressure differential between the two sides 2062, 2066 of the hammer 2030.

With the valve disc 2106 unseated from the hammer 2030, the auxiliary openings 2126 are placed in fluid communication with the hammer aperture 2074, thereby providing for additional fluid flow through the valve assembly 2098. In other words, the disc 2106 deflects away from the hammer 2030 as the hammer 2030 is returning toward the anvil 2026, which creates additional fluid flow through the valve assembly 2098. Once the hammer 2030 has axially returned to the anvil 2026, the valve assembly 2098 returns to the closed state (FIG. 12C), and the impact assembly is ready to begin another impact and hammer retraction phase. In other words, when the hammer 2030 has returned, the pressure on both sides 2062, 2066 of the hammer 2030 has equalized and the disc 2106 is re-seated against the rear surface 2130 of the hammer 2030 by the bias of the valve spring 2110. As such, the valve assembly 2098 provides for additional fluid flow through the valve assembly 2098 when the hammer 2030 is returning toward the anvil 2026 in order to more quickly reset the hammer 2030 for the next impact cycle. In other words, the valve assembly 2098 reduces the amount of time it takes to complete an impact cycle.

FIGS. 13-31 schematically illustrate different arrangements of the second embodiment of the impact tool 10 shown in FIG. 3.

Figure 13:
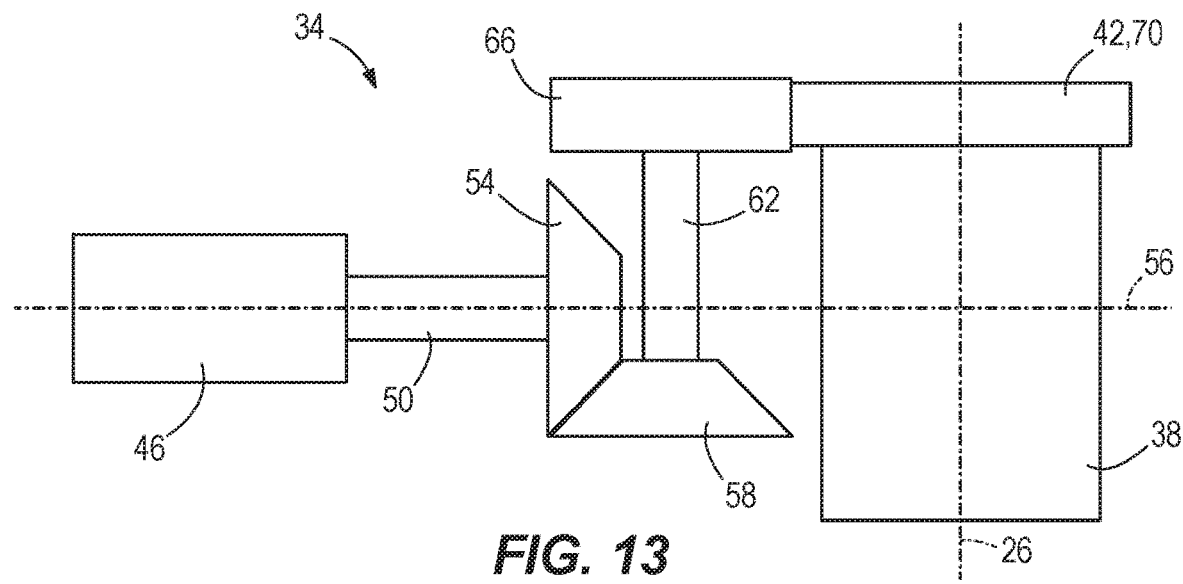
FIG. 13 is a schematic view of a first gear train arrangement of the impact tool embodiment of FIG. 3.

FIG. 13 illustrates an embodiment in which the motor 30 includes a motor pinion 46 coupled to a first intermediate shaft 50 having a first bevel gear 54. In the embodiment of FIG. 13, the motor 30 has a motor axis 56 that is parallel to or coaxial with the handle axis 22 and perpendicular to the output axis 26. The first bevel gear 54 is engaged with a second bevel gear 58 on the end of a second intermediate shaft 62. The second intermediate shaft 62 also includes a first spur gear 66 that is engaged with a second spur gear 70, which functions as the rotational input 42 in the embodiment of FIG. 13. The second spur gear 70 drives the rotary impact mechanism 38.

Figure 14:
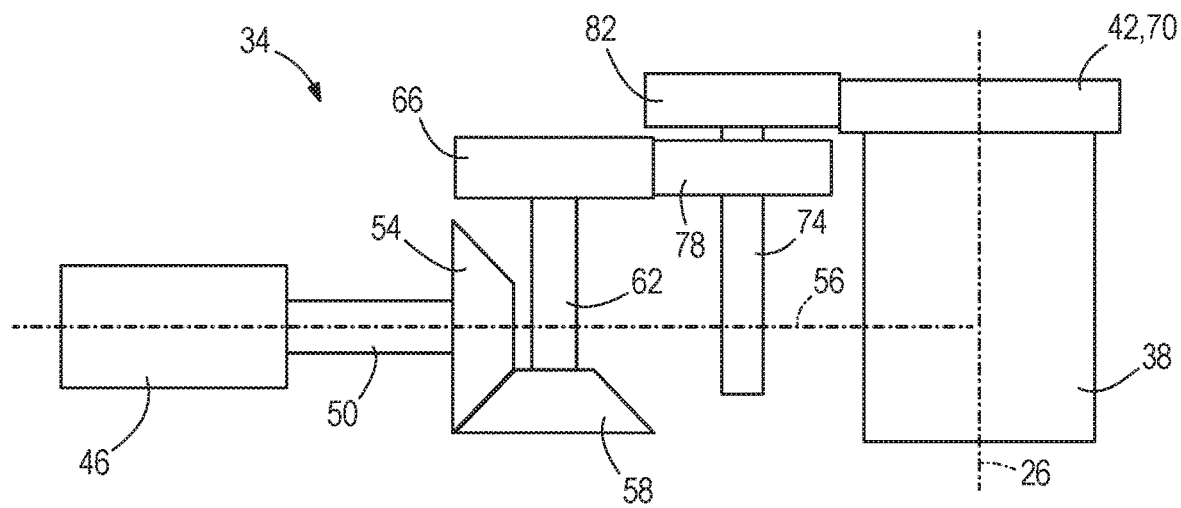
FIG. 14 is a schematic view of a second gear train arrangement of the impact tool embodiment of FIG. 3.

FIG. 14 illustrates an embodiment that is similar to the embodiment of FIG. 13, except that a third intermediate shaft 74 with third and fourth spur gears 78, 82 is interposed between the first spur gear 66 and second spur gear 70, with the third spur gear 78 in meshing engagement with the first spur gear 66 and the fourth spur gear 82 in meshing engagement with the second spur gear 70.

Figure 15:
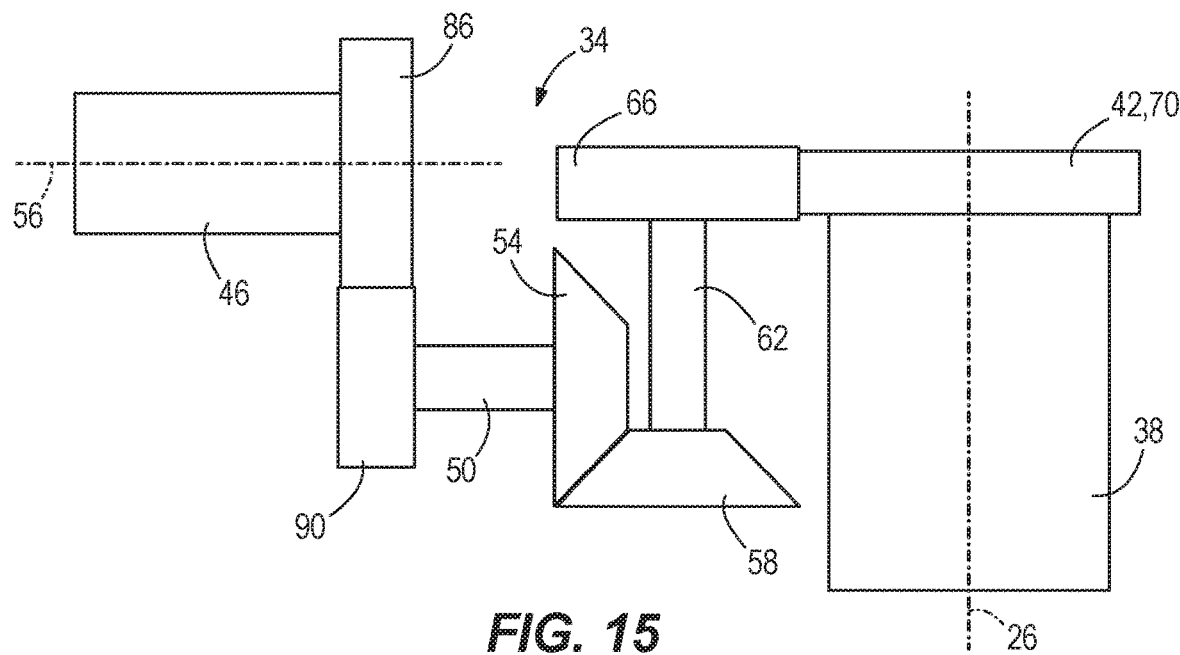
FIG. 15 is a schematic view of a third gear train arrangement of the impact tool embodiment of FIG. 3.

FIG. 15 illustrates an embodiment that is similar to the embodiment of FIG. 13, except that instead of the motor pinion 46 directly driving the first intermediate shaft 50, the motor pinion 46 drives a fifth spur gear 86 that is in meshing engagement with a sixth spur gear 90 on the end of the first intermediate shaft 50.

Figure 16:
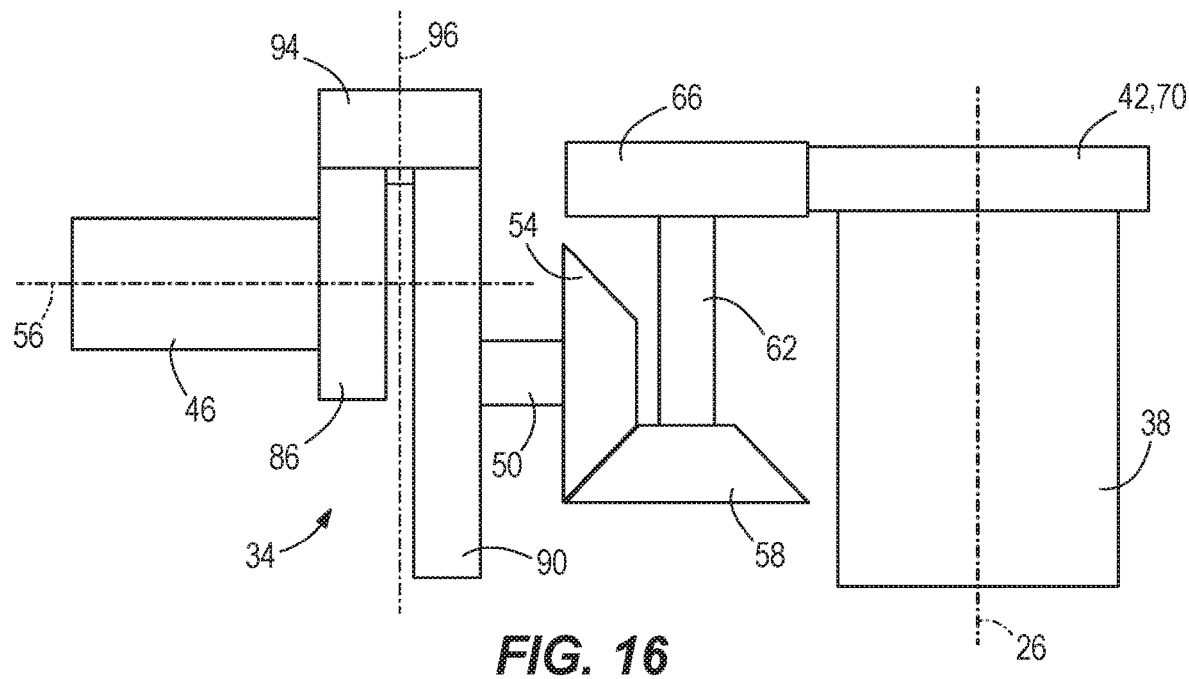
FIG. 16 is a schematic view of a fourth gear train arrangement of the impact tool embodiment of FIG. 3.

FIG. 16 illustrates an embodiment that is similar to the embodiment of FIG. 15, except that a first face gear 94 is interposed between the fifth and sixth spur gears 86, 90 to transfer torque therebetween. The first face gear 94 rotates about a third axis 96 that is parallel to the second axis 26 when transferring torque from the fifth spur gear 86 to the sixth spur gear 90.

Figure 17:
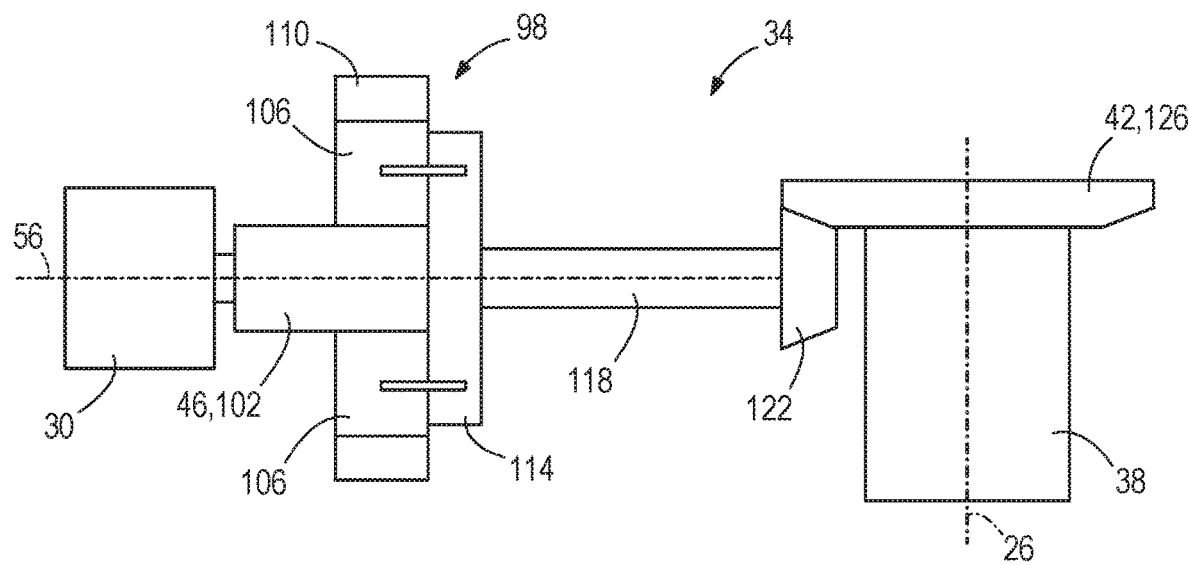
FIG. 17 is a schematic view of a fifth gear train arrangement of the impact tool embodiment of FIG. 3.

FIG. 17 illustrates an embodiment in which the motor pinion 46 functions as a sun gear 102 of a first planetary gear stage 98 in the gear train 34. The first planetary gear stage 98 also includes a plurality of planet gears 106 encircling the sun gear 102 and rotatable about the sun gear 102 within a rotationally fixed ring gear 110. A planet carrier 114 is coupled to the planet gears 106, such that rotation of the planet gears 106 about the sun gear 102 causes rotation of the planet carrier 114. A fourth intermediate shaft 118 extends from the planet carrier 114 and includes a third bevel gear 122 in meshing engagement with a fourth bevel gear 126 that in the embodiment of FIG. 17 functions as the rotational input 42.

Figure 18:
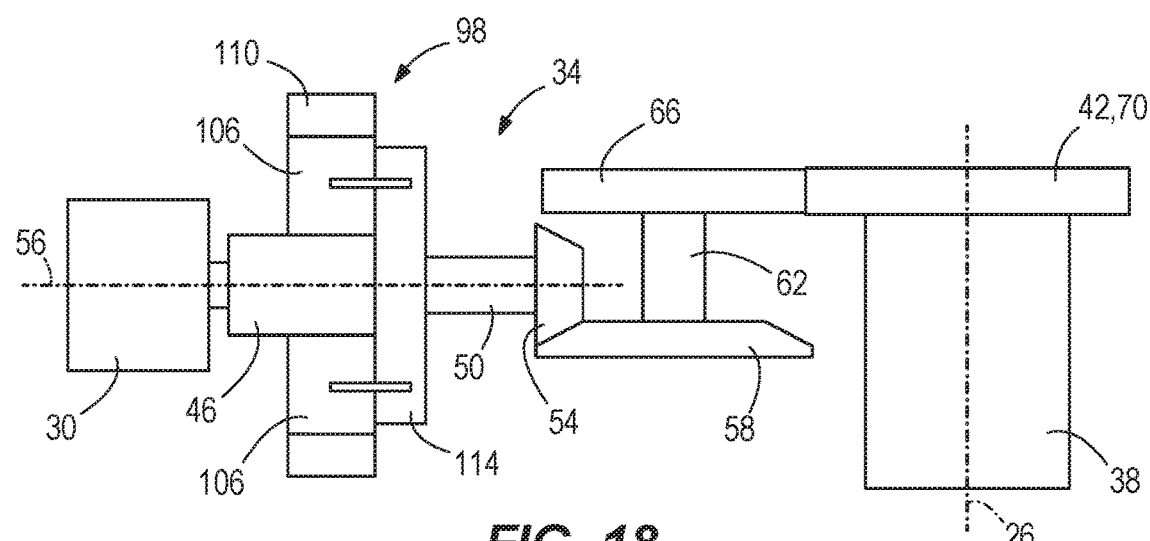
FIG. 18 is a schematic view of a sixth gear train arrangement of the impact tool embodiment of FIG. 3.

FIG. 18 illustrates an embodiment that is similar to the embodiment of FIG. 13, except that instead of the motor pinion 46 directly driving the first intermediate shaft 50, the first intermediate shaft 50 is driven by the planetary stage 98 of the embodiment of FIG. 17.

Figure 19:
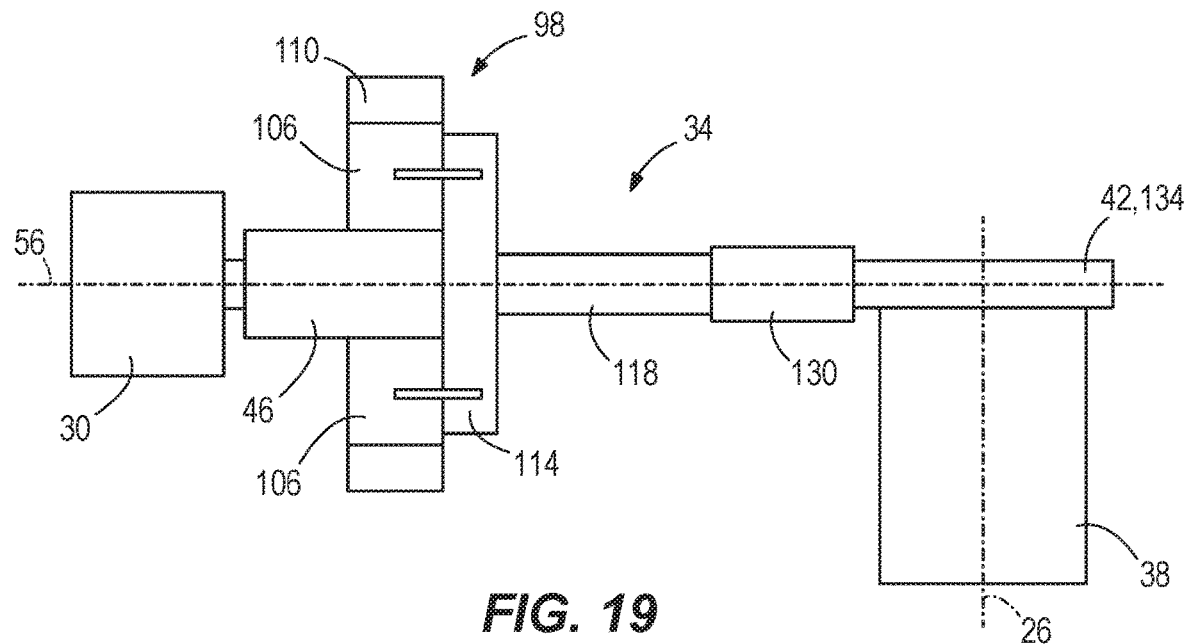
FIG. 19 is a schematic view of a seventh gear train arrangement of the impact tool embodiment of FIG. 3.

FIG. 19 illustrates an embodiment that is similar to the embodiment of FIG. 17, except that instead of the third bevel gear 122, the fourth intermediate shaft 118 includes a worm gear 130, and instead of the fourth bevel gear 126, the rotational input 42 is an eighth spur gear 134 that is driven by the worm gear 130.

Figure 20:
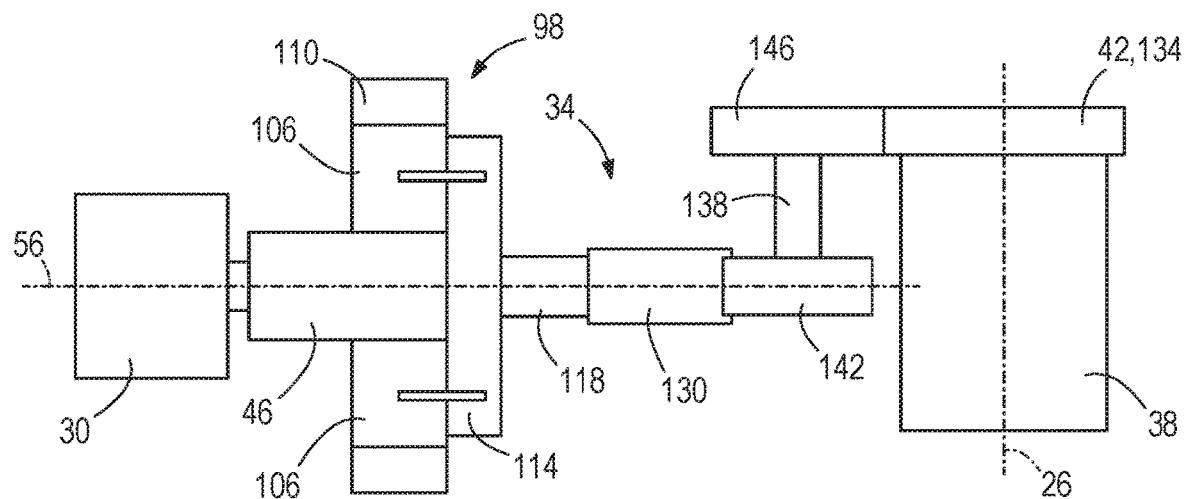
FIG. 20 is a schematic view of an eighth gear train arrangement of the impact tool embodiment of FIG. 3.

FIG. 20 illustrates an embodiment that is similar to the embodiment of FIG. 19, except that a fifth intermediate shaft 138 with ninth and tenth spur gears 142, 146 is interposed between the worm gear 130 and the eighth spur gear 134, with the ninth spur gear 142 engaged with the worm gear 130 and the tenth spur gear 146 engaged with the eight spur gear 134.

Figure 21:
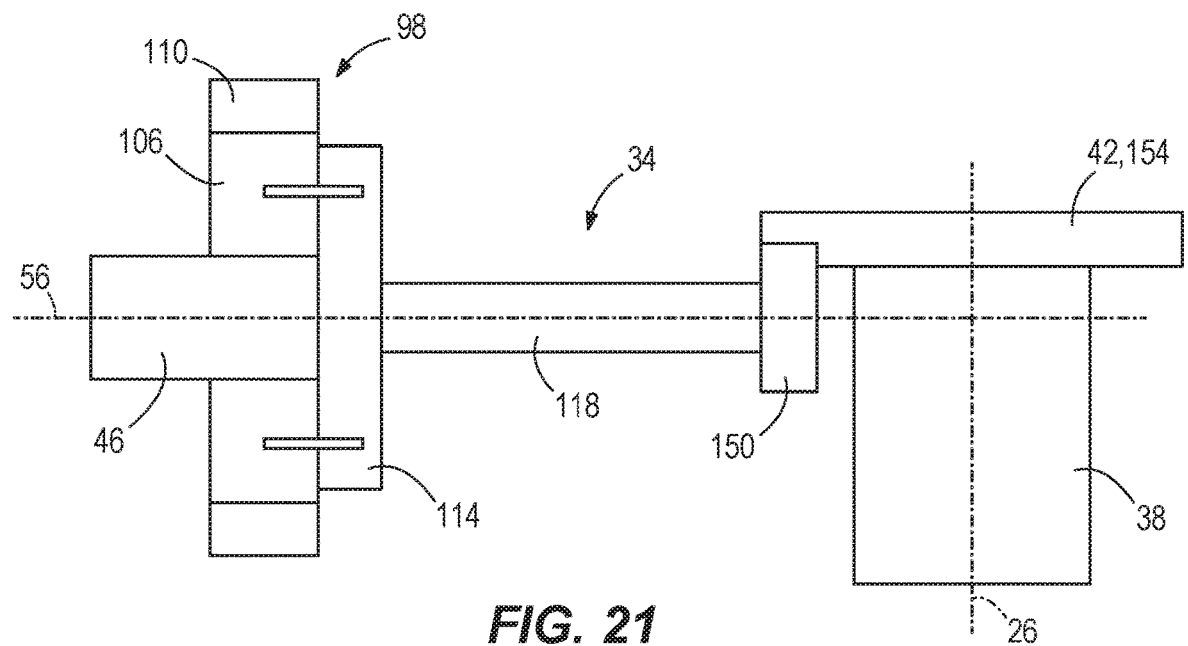
FIG. 21 is a schematic view of a ninth gear train arrangement of the impact tool embodiment of FIG. 3.

FIG. 21 illustrates an embodiment that is similar to the embodiment of FIG. 17, except that instead of the third bevel gear 122 and the fourth bevel gear 126, the fourth intermediate shaft 118 includes a pinion 150 that interfaces with a second face gear 154 that functions as the rotational input 42.

Figure 22:
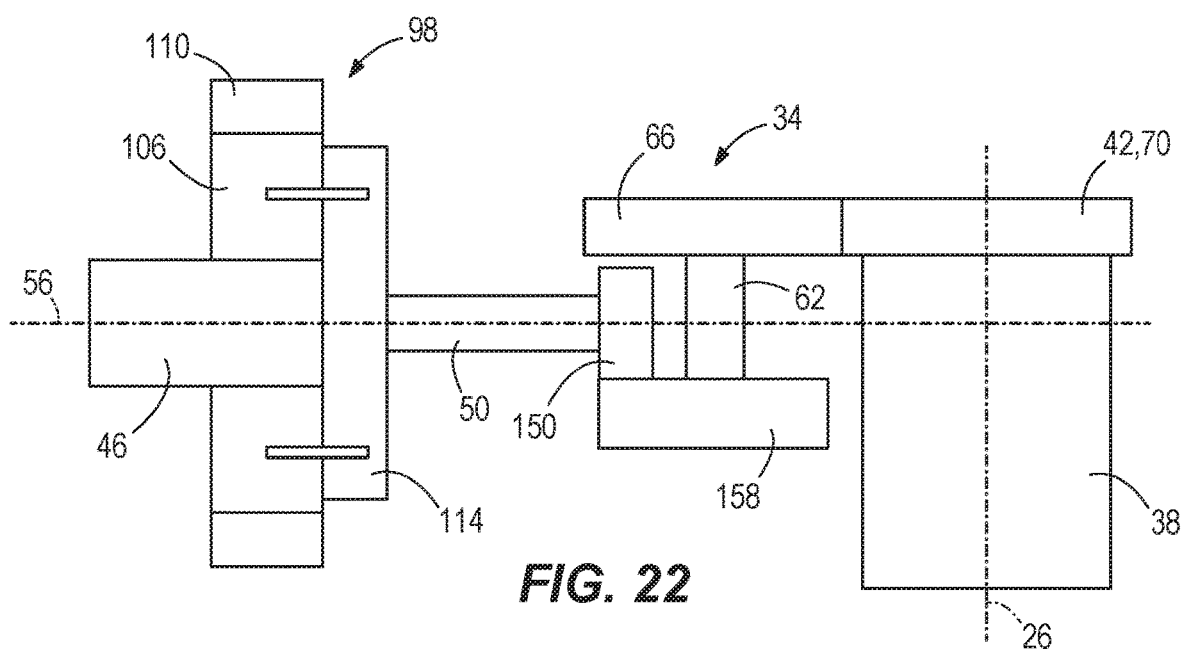
FIG. 22 is a schematic view of a tenth gear train arrangement of the impact tool embodiment of FIG. 3.

FIG. 22 illustrates an embodiment that is similar to the embodiment of FIG. 18, except that instead of the first bevel gear 54 and second bevel gear 58, the first intermediate shaft 50 includes the pinion 150 that interfaces with a third face gear 158 on the second intermediate shaft 62.

Figure 23:
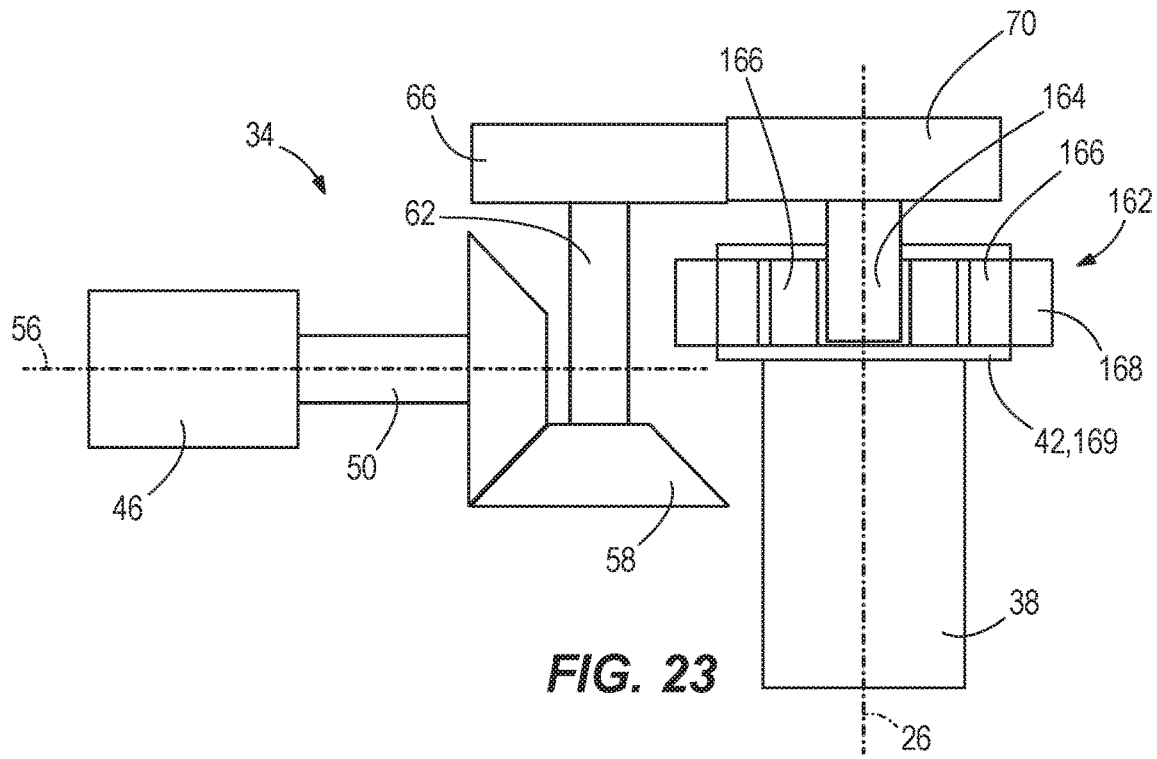
FIG. 23 is a schematic view of an eleventh gear train arrangement of the impact tool embodiment of FIG. 3.

FIG. 23 is similar to the embodiment of FIG. 13, but the gear train 34 also includes a planetary gear stage 162 between the second spur gear 70 and the rotary impact mechanism 38, with a pinion 164 of the second spur gear 70 functioning as a sun gear of the planetary gear stage 162. The planetary gear stage 162 also includes planet gears 166, a fixed gear ring 168, and a planet carrier 169 coupled to the planet gears 166, such that rotation of the planet gears 166 about the pinion 164 causes rotation of the planet carrier 169, which in turn drives the impact mechanism 38. Thus, in the embodiment of FIG. 23, the planet carrier 169 functions as the rotational input 42 instead of the second spur gear 70.

Figure 24:
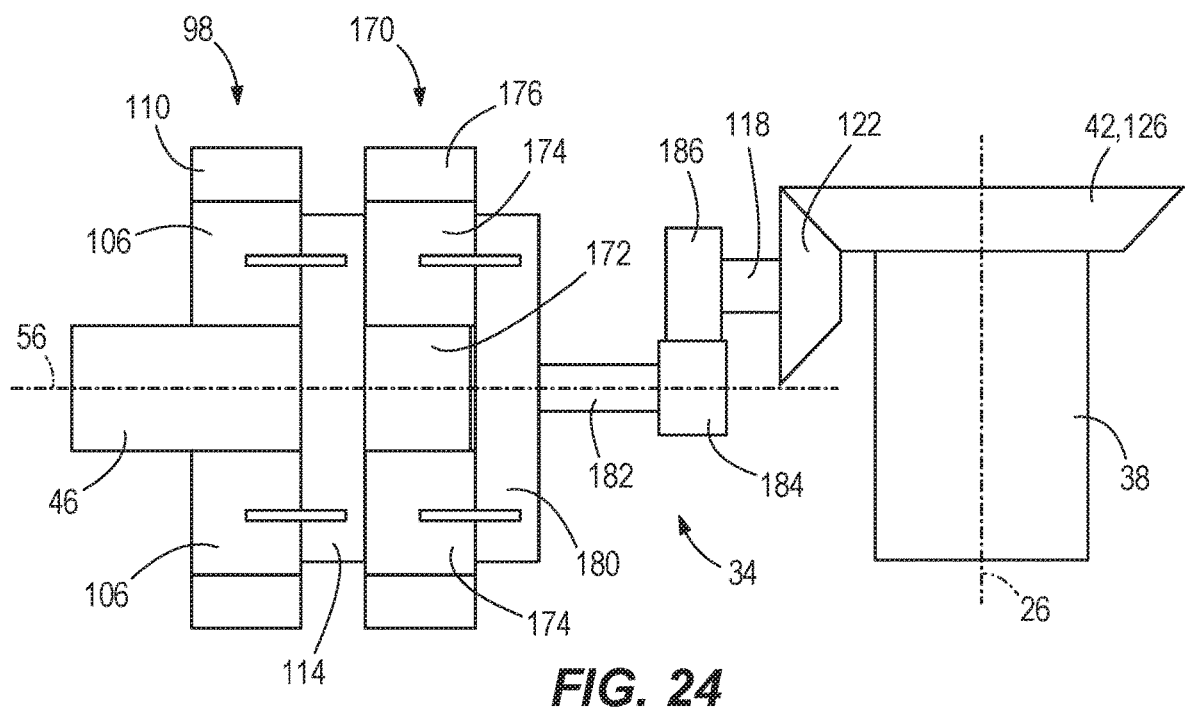
FIG. 24 is a schematic view of a twelfth gear train arrangement of the impact tool embodiment of FIG. 3.

FIG. 24 is similar to the embodiment of FIG. 17, with the following differences. First, instead of the fourth intermediate shaft 118, a second planetary gear stage 170 is driven by a sun gear 172 of the planet carrier 114 of the first planetary gear stage 98. The second planetary gear stage 170 includes a plurality of planet gears 174, a fixed ring gear 176, and a planet carrier 180 coupled to the planet gears 174, such that rotation of the planet gears 174 about the sun gear 172 causes rotation of the planet carrier 180. Additionally, a sixth intermediate shaft 182 with an eleventh spur gear 184 is driven by the planet carrier 180 of the second planetary gear stage 170 and the fourth intermediate shaft 118 includes a twelfth spur gear 186 that is engaged with the eleventh spur gear 184.

Figure 25:
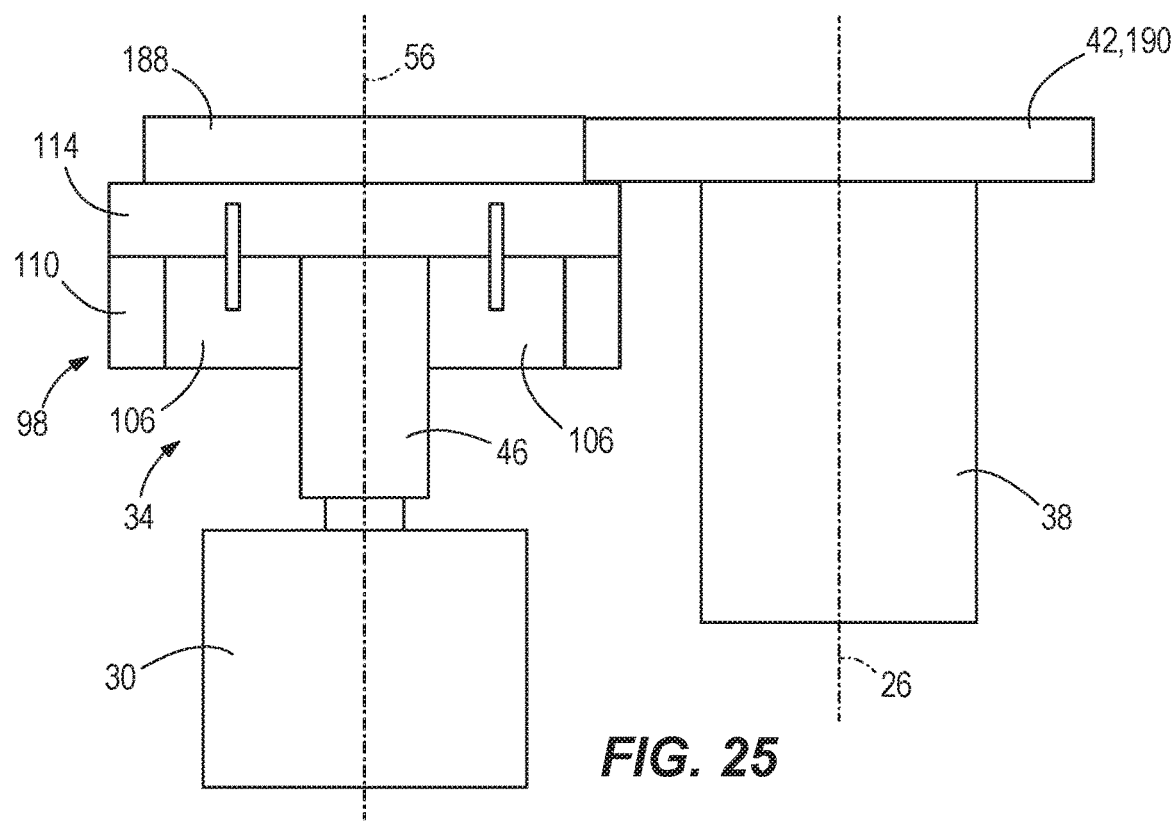
FIG. 25 is a schematic view of a thirteenth gear train arrangement of the impact tool embodiment of FIG. 3.

FIG. 25 illustrates an embodiment that is similar to the embodiment of FIG. 17, with the following differences. In the embodiment of FIG. 25, the motor axis 56 is perpendicular to the handle axis 22 and parallel to the output axis 26. Additionally, the planet carrier 114 of the first planetary gear stage 98 drives a thirteenth spur gear 188 that engages a fourteenth spur gear 190 that functions as the rotational input 42.

Figure 26:
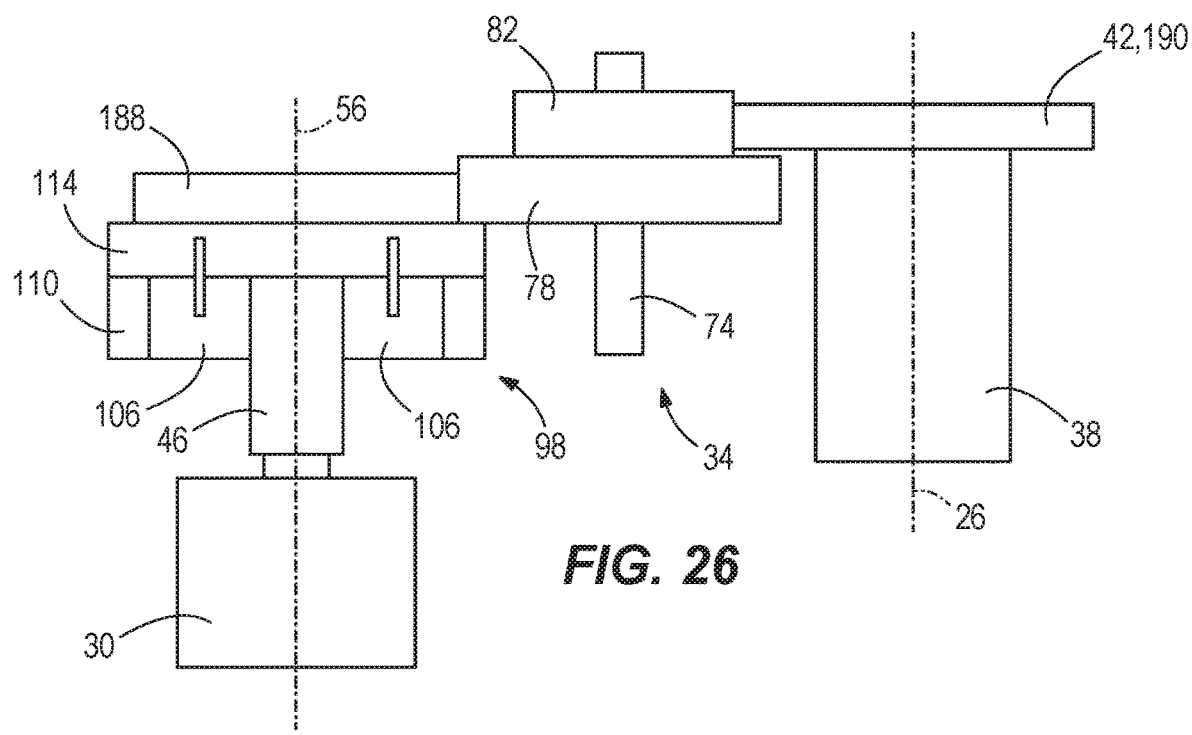
FIG. 26 is a schematic view of a fourteenth gear train arrangement of the impact tool embodiment of FIG. 3.

FIG. 26 illustrates an embodiment that is similar to the embodiment of FIG. 25, except that the third intermediate shaft 74 of the embodiment of FIG. 14 is interposed between the thirteenth spur gear 186 and the fourteenth spur gear 190, with the third spur gear 78 in meshing engagement with the thirteenth spur gear 188 and the fourth spur gear 82 in meshing engagement with the fourteenth spur gear 190.

Figure 27:
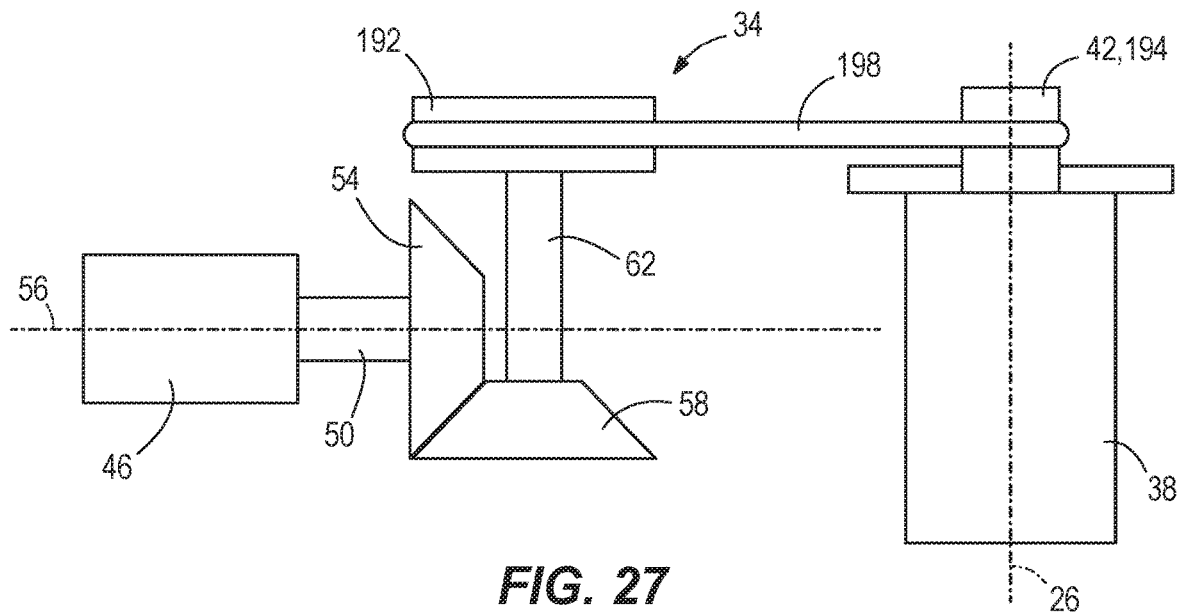
FIG. 27 is a schematic view of a fifteenth gear train arrangement of the impact tool embodiment of FIG. 3.

FIG. 27 illustrates an embodiment that is similar to the embodiment of FIG. 13, except that a drive wheel 192 replaces the first spur gear 66, a driven wheel 194 replaces the second spur gear 70 to function as the rotational input 42, and an endless drive member 198 is interposed between the drive wheel 192 and the driven wheel 194 to transfer torque therebetween. In some embodiments, the drive and driven wheels 192, 194 are pulleys and the endless drive member 198 is a belt. In other embodiments, the drive and driven wheels 192, 194 are sprockets and the endless driven member 198 is a chain.

Figure 28:
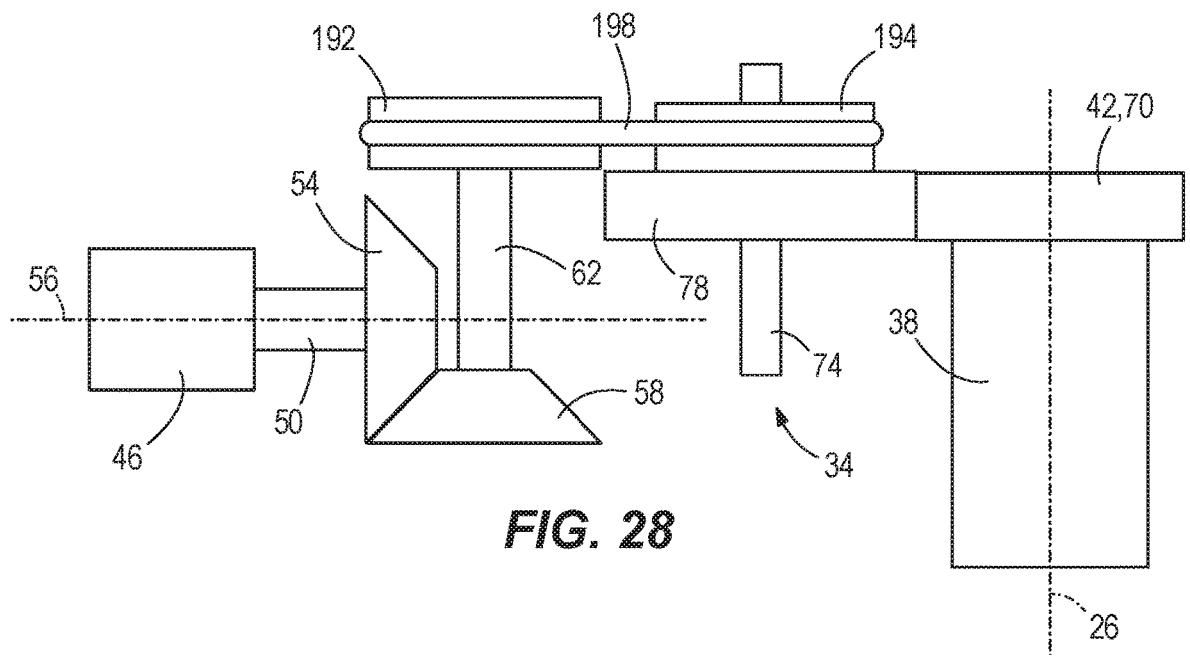
FIG. 28 is a schematic view of a sixteenth gear train arrangement of the impact tool embodiment of FIG. 3.

FIG. 28 illustrates an embodiment that is similar to the embodiment of FIG. 14, except that the drive wheel 192 replaces the first spur gear 66, the driven wheel 194 replaces the fourth spur gear 92, the endless drive member 198 is interposed between the drive wheel 192 and the driven wheel 194 to transfer torque therebetween, and the third spur gear 78 is in meshing engagement with the second spur gear 70. In some embodiments, the drive and driven wheels 192, 194 are pulleys and the endless drive member 198 is a belt. In other embodiments, the drive and driven wheels 192, 194 are sprockets and the endless driven member 198 is a chain.

Figure 29:
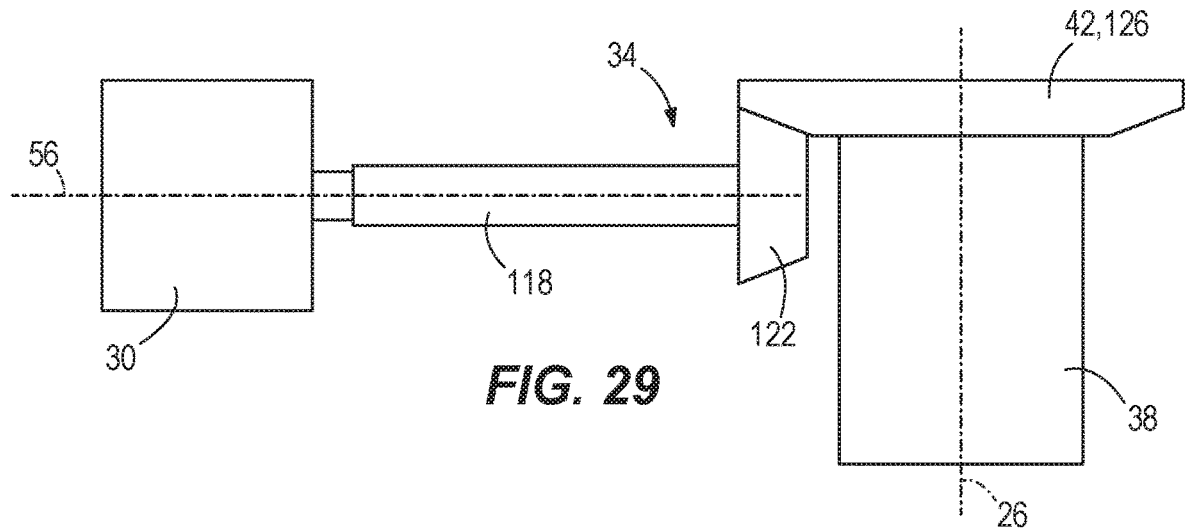
FIG. 29 is a schematic view of an seventeenth gear train arrangement of the impact tool embodiment of FIG. 3.

FIG. 29 illustrates an embodiment that is similar to the embodiment of FIG. 17, except that the motor pinion 46 and the planetary gear stage 98 is omitted and the motor 30 directly drives the fourth intermediate shaft 118.

Figure 30:
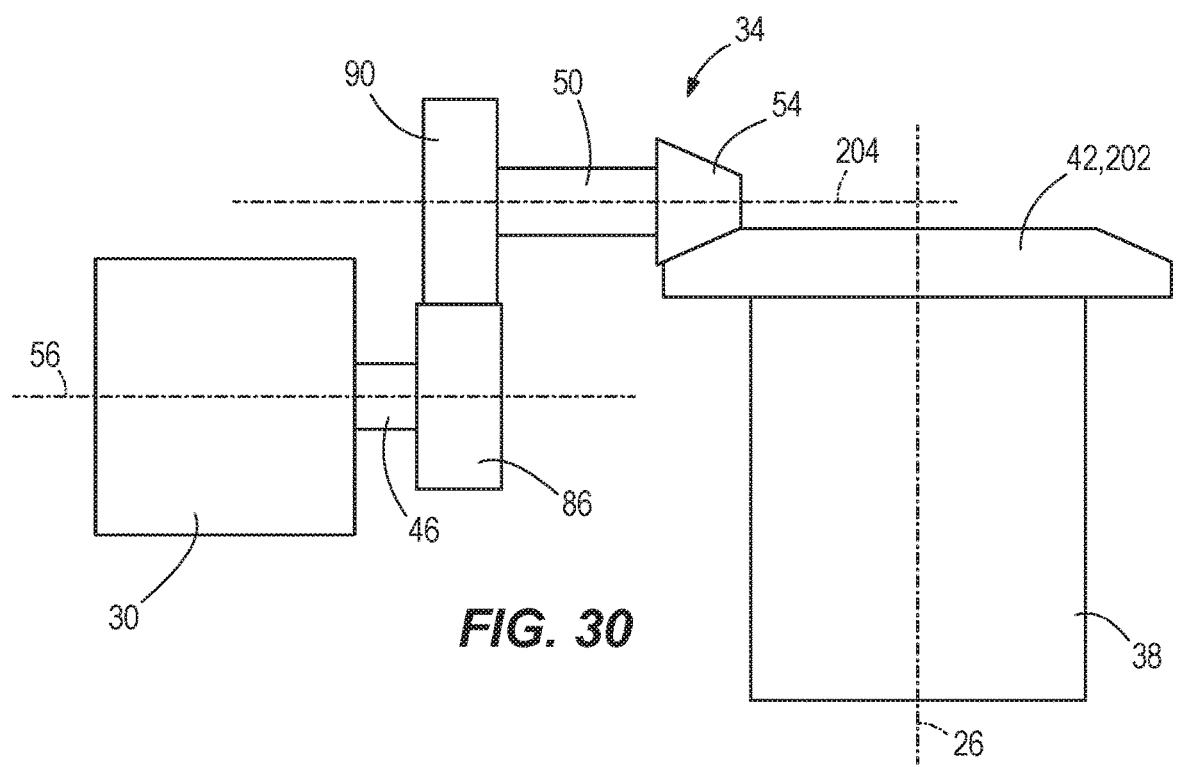
FIG. 30 is a schematic view of a eighteenth gear train arrangement of the impact tool embodiment of FIG. 3.

FIG. 30 illustrates an embodiment that is similar to the embodiment of FIG. 15, except that the second intermediate shaft 62 is omitted and the second spur gear 70 is replaced with a fifth bevel gear 202 that functions as the rotational input 42 and is in meshing engagement with the first bevel gear 54. Also, the first intermediate shaft 50 defines a fourth axis 204 that is parallel to the motor axis 56, and the first intermediate shaft 50 is arranged such that the fifth bevel gear 202 is arranged between the motor axis 56 and the fourth axis 204.

Figure 31:
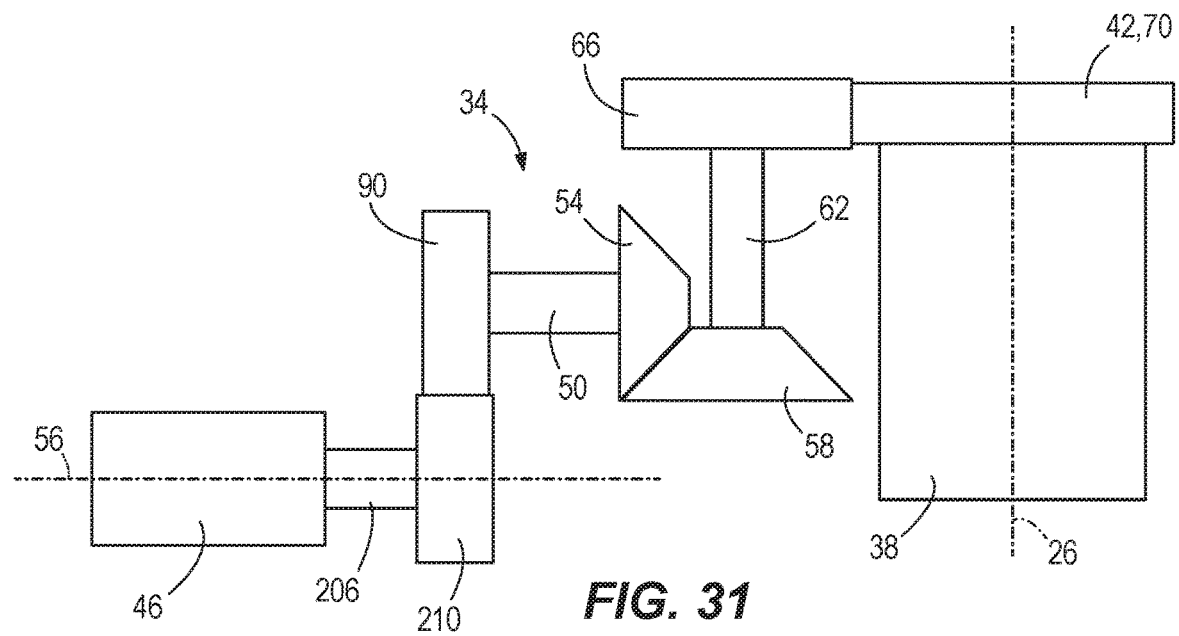
FIG. 31 is a schematic view of a nineteenth gear train arrangement of the impact tool embodiment of FIG. 3.

FIG. 31 illustrates an embodiment that is similar to the embodiment of FIG. 13, except that a seventh intermediate shaft 206 is driven by the motor pinion 46 instead of the first intermediate shaft 50, and the seventh intermediate shaft 206 includes a fifteenth spur gear 210 that is in meshing engagement with the sixth spur gear 90, such that the fifteenth spur gear 210 drives the sixth spur gear 90.

In each of the embodiments of FIGS. 13-31 that include spur gears, other types of parallel axis gears (e.g., helical gears) may be used. Although FIGS. 13-31 schematically illustrate different arrangements of the second embodiment of the impact tool 10 shown in FIG. 3, each of the embodiments of FIGS. 13-31 could be modified to arrange the rotary impact mechanism 38 upstream of the rotational input 42, with the output of the rotational input 42 driving the output member 43, as shown in FIG. 2.

Various features of the invention are set forth in the following claims.

What is claimed is:
1. An impact tool comprising:
 a housing having a handle portion defining a first axis;
 a motor supported by the housing and defining a motor axis;
 a rotary impact mechanism arranged on a second axis that is perpendicular to the first axis, the rotary impact mechanism configured to convert a continuous rotational input from the motor to consecutive rotational impacts upon a workpiece, the rotary impact mechanism including
  a cylinder partially defining a chamber containing a hydraulic fluid,
  an anvil positioned at least partially within the chamber, and
  a hammer for imparting the consecutive rotational impacts upon the anvil, the hammer configured to translate within the cylinder along the second axis in a first direction, towards the anvil, and a second direction, away from the anvil; and
 a gear train that receives torque from the motor and includes a rotational input that transfers torque to the rotary impact mechanism,
 wherein the hydraulic fluid is at a first pressure on a first side of the hammer and at a second pressure greater than the first pressure on a second side of the hammer opposite the first side when the hammer translates away from the anvil.
2. The impact tool of claim 1,
 wherein the gear train includes a first intermediate shaft that is coaxial with the motor axis, receives torque from the motor, and includes a first bevel gear, and a second intermediate shaft that is parallel with the second axis and includes a first parallel axis gear and a second bevel gear that is engaged with the first bevel gear, and wherein the rotational input is configured as a second parallel axis gear that is engaged with the first parallel axis gear.

3. The impact tool of claim 1, wherein the gear train includes a first intermediate shaft that is coaxial with the motor axis, receives torque from the motor, and includes a first bevel gear, a second intermediate shaft that is parallel with the second axis and includes a first parallel axis gear and a second bevel gear that is engaged with the first bevel gear, and a third intermediate shaft that is parallel with the second intermediate shaft and includes a second parallel axis gear and a third parallel axis gear, the second parallel axis gear being engaged with the first parallel axis gear, and wherein the rotational input is configured as a fourth parallel axis gear that is engaged with the third parallel axis gear.

4. The impact tool of claim 1, wherein the gear train includes a first parallel axis gear that is coaxial with the motor axis and receives torque from the motor, a first intermediate shaft that is parallel with the motor axis and includes a first bevel gear and a second parallel axis gear that is engaged with the first parallel axis gear, and a second intermediate shaft that is parallel with the second axis and includes a third parallel axis gear and a second bevel gear that is engaged with the first bevel gear, and wherein the rotational input is configured as a fourth parallel axis gear that is engaged with the third parallel axis gear.

5. The impact tool of claim 1, wherein the gear train includes a first parallel axis gear that is coaxial with the motor axis and receives torque from the motor, a first intermediate shaft that is parallel with the motor axis and includes a first bevel gear and a second parallel axis gear, a face gear rotatable about a third axis that is parallel with the second axis, the face gear engaged with the first parallel axis gear and the second parallel axis gear, and a second intermediate shaft that is parallel with the second axis and includes a third parallel axis gear and a second bevel gear that is engaged with the first bevel gear, and wherein the rotational input is configured as a fourth parallel axis gear that is engaged with the third parallel axis gear.

6. The impact tool of claim 1, wherein the gear train includes a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, and an intermediate shaft that is coaxial with the motor axis and is coupled to the planet carrier, the intermediate shaft including a first bevel gear, and wherein the rotational input is configured as a second bevel gear that is engaged with the first bevel gear.

7. The impact tool of claim 1, wherein the gear train includes a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, a first intermediate shaft that is coaxial with the motor axis and is coupled to the planet carrier, the first intermediate shaft including a first bevel gear, and a second intermediate shaft that is parallel with the second axis and includes a first parallel axis gear and a second bevel gear that is engaged with the first bevel gear, and wherein the rotational input is configured as a second parallel axis gear that is engaged with the first parallel axis gear.

8. The impact tool of claim 1, wherein the gear train includes a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, and an intermediate shaft that is coaxial with the motor axis and is coupled to the planet carrier, the intermediate shaft including a worm gear, and wherein the rotational input is configured as a spur gear that is engaged with the worm gear.

9. The impact tool of claim 1, wherein the gear train includes a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, a first intermediate shaft that is coaxial with the motor axis and is coupled to the planet carrier, the intermediate shaft including a worm gear, and a second intermediate shaft that is parallel with the second axis and includes a spur gear that is engaged with the worm gear, and
a first parallel axis gear, and
wherein the rotational input is configured as a second parallel axis gear that is engaged with the first parallel axis gear.

10. The impact tool of claim 1,
wherein the gear train includes
a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, and
an intermediate shaft that is coaxial with the motor axis and is coupled to the planet carrier, the intermediate shaft including a pinion, and
wherein the rotational input is configured as a face gear that is engaged with the pinion.

11. The impact tool of claim 1,
wherein the gear train includes
a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier,
a first intermediate shaft that is coaxial with the motor axis and is coupled to the planet carrier, the intermediate shaft including a pinion, and
a second intermediate shaft that is parallel with the second axis and includes a first parallel axis gear and a face gear that is engaged with the pinion, and
wherein the rotational input is configured as a second parallel axis gear that is engaged with the first parallel axis gear.

12. The impact tool of claim 1,
wherein the gear train includes
a first intermediate shaft that is coaxial with the motor axis, receives torque from the motor, and includes a first bevel gear,
a second intermediate shaft that is parallel with the second axis and includes a first parallel axis gear and a second bevel gear that is engaged with the first bevel gear,
a second parallel axis gear that is engaged with the first parallel axis gear, the second parallel axis gear configured to rotate about the second axis, and
a planetary gear stage that receives torque from the second parallel axis gear, the planetary gear stage including
a sun gear configured as a pinion coupled to the second parallel axis gear,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, such that the planet carrier functions as the rotational input to drive the rotary impact mechanism.

13. The impact tool of claim 1,
wherein the gear train includes
a first planetary gear stage that receives torque from the motor, the first planetary gear stage including
a first sun gear configured as a motor pinion of the motor,
a rotationally fixed first ring gear,
a plurality of first planet gears encircling the first sun gear and rotatable about the first sun gear within the first ring gear, and
a first planet carrier coupled to the plurality of first planet gears, such that rotation of first planet gears about the first sun gear causes rotation of the first planet carrier,
a second planetary gear stage that receives torque from the first planetary gear stage, the second planetary gear stage including
a second sun gear coupled to the first planet carrier,
a rotationally fixed second ring gear,
a plurality of second planet gears encircling the second sun gear and rotatable about the second sun gear within the second ring gear, and
a second planet carrier coupled to the plurality of second planet gears, such that rotation of the second planet gears about the second sun gear causes rotation of the second planet carrier,
a first intermediate shaft that is coaxial with the motor axis and is coupled to the second planet carrier, the intermediate shaft including a first parallel axis gear, and
a second intermediate shaft that is parallel with the motor axis and includes a first bevel gear and a second parallel axis gear that is engaged with the first parallel axis gear, and
wherein the rotational input is configured as a second bevel gear that is engaged with the first bevel gear.

14. The impact tool of claim 1,
wherein the motor axis is parallel with the second axis, and
wherein the gear train includes
a planetary gear stage that receives torque from the motor, the planetary gear stage including
a sun gear configured as a motor pinion of the motor,
a rotationally fixed ring gear,
a plurality of planet gears encircling the sun gear and rotatable about the sun gear within the ring gear, and
a planet carrier coupled to the planet gears, such that rotation of the planet gears about the sun gear causes rotation of the planet carrier, and
a first parallel axis gear that is coupled for rotation with the planet carrier, and
wherein the rotational input is configured as a second parallel axis gear that is engaged with the first parallel axis gear.

15. The impact tool of claim 1,
wherein the motor axis is parallel with the second axis, and
wherein the gear train includes
a planetary gear stage that receives torque from the motor, the planetary gear stage including
a sun gear configured as a motor pinion of the motor,
a rotationally fixed ring gear, a plurality of planet gears encircling the sun gear and rotatable about the sun gear within the ring gear, and a planet carrier coupled to the planet gears, such that rotation of the planet gears about the sun gear causes rotation of the planet carrier, a first parallel axis gear that is coupled for rotation with the planet carrier, and an intermediate shaft that is parallel with the motor axis and the second axis, the intermediate shaft including a second parallel axis gear that is engaged with the first parallel axis gear, and a third parallel axis gear, and wherein the rotational input is configured as a fourth parallel axis gear that is engaged with the third parallel axis gear.

16. The impact tool of claim 1,
wherein the gear train includes
a first intermediate shaft that is coaxial with the motor axis, receives torque from the motor, and includes a first bevel gear, and
a second intermediate shaft that is parallel with the second axis and includes a drive wheel and a second bevel gear that is engaged with the first bevel gear,
wherein the rotational input is configured as a driven wheel, and
wherein an endless drive member rotatably couples the drive wheel to the driven wheel, such that the endless drive member transfers toque from the drive wheel to the driven wheel.

17. The impact tool of claim 1,
wherein the gear train includes
a first intermediate shaft that is coaxial with the motor axis, receives torque from the motor, and includes a first bevel gear,
a second intermediate shaft that is parallel with the second axis and includes a drive wheel and a second bevel gear that is engaged with the first bevel gear, and
a third intermediate shaft that is parallel with the second intermediate shaft and includes a driven wheel and a first parallel axis gear,
wherein the rotational input is configured as a second parallel axis gear that is engaged with the first parallel axis gear, and
wherein an endless drive member rotatably couples the drive wheel to the driven wheel, such that the endless drive member transfers torque from the drive wheel to the driven wheel.

18. The impact tool of claim 1,
wherein the gear train includes an intermediate shaft that receives torque from the motor and is coaxial with the motor axis, the intermediate shaft including a first bevel gear, and
wherein the rotational input is configured as a second bevel gear that is engaged with the first bevel gear.

19. The impact tool of claim 1,
wherein the gear train includes
a first parallel axis gear that is coaxial with the motor axis and receives torque from the motor, and
a first intermediate shaft defining a third axis that is parallel with the motor axis, the first intermediate shaft including a first bevel gear and a second parallel axis gear that is engaged with the first parallel axis gear, and
wherein the rotational input is configured as a second bevel gear that is engaged with the first bevel gear and is arranged between the motor axis and the third axis.

20. The impact tool of claim 1,
wherein the gear train includes
a first intermediate shaft that is coaxial with the motor axis, receives torque from the motor, and includes a first parallel axis gear,
a second intermediate shaft that is parallel with the motor axis and includes a first bevel gear and a second parallel axis gear that is engaged with the first parallel axis gear, and
a third intermediate shaft that is parallel with the second axis and includes a third parallel axis gear and a second bevel gear that is engaged with the first bevel gear, and
wherein the rotational input is configured as a fourth parallel axis gear that is engaged with the third parallel axis gear.

21. The impact tool of claim 1, wherein the rotational input transmits torque to the cylinder to rotate the cylinder.

22. The impact tool of claim 1, wherein the hammer includes a central aperture to allow the hydraulic fluid to pass through the hammer, and wherein the hydraulic fluid flows through the central aperture when the hammer moves in the second direction.

23. An impact tool comprising:
a housing having a handle portion defining a first axis;
a motor supported by the housing and defining a motor axis; and
a rotary impact mechanism arranged on a second axis that is perpendicular to the first axis, the rotary impact mechanism configured to convert a continuous rotational input from the motor to consecutive rotational impacts upon a workpiece, the rotary impact mechanism including
a chamber containing a hydraulic fluid,
an anvil positioned at least partially within the chamber,
a hammer for imparting the consecutive rotational impacts upon the anvil, the hydraulic fluid configured to attenuate a noise of the rotary impact mechanism that is created by the hammer impacting the anvil, wherein the hammer is movable in a first direction toward the anvil and a second direction away from the anvil, and
a valve assembly including a valve housing biased toward the hammer by a hammer spring and configured to move with the hammer in the second direction.

24. The impact tool of claim 23, wherein the valve assembly includes a disc within the valve housing and biased toward the hammer by a valve spring.

* * * * *